United States Patent
Aoba

(10) Patent No.: US 11,165,948 B2
(45) Date of Patent: Nov. 2, 2021

(54) IMAGING APPARATUS FOR CONTROLLING AN IMAGING FUNCTION THAT AFFECTS AN IMAGING RESULT

(71) Applicant: CANON KABUSHIKI KAISHA, Tokyo (JP)

(72) Inventor: Masato Aoba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 16/447,676

(22) Filed: Jun. 20, 2019

(65) Prior Publication Data
US 2020/0007781 A1 Jan. 2, 2020

(30) Foreign Application Priority Data

Jun. 29, 2018 (JP) .............................. JP2018-125009
Jun. 29, 2018 (JP) .............................. JP2018-125010

(51) Int. Cl.
*G06K 9/00* (2006.01)
*H04N 5/232* (2006.01)
*G06N 3/04* (2006.01)
*G06N 3/08* (2006.01)

(52) U.S. Cl.
CPC ..... *H04N 5/232127* (2018.08); *G06N 3/0472* (2013.01); *G06N 3/08* (2013.01); *H04N 5/23227* (2018.08); *H04N 5/23245* (2013.01)

(58) Field of Classification Search
CPC ...... G06K 9/66; G06K 9/6254; G06K 9/6255; G06K 9/6216; G06K 9/00228; H04N 5/232127; H04N 5/23227; H04N 5/23245; H04N 7/0145; G06N 3/08; G06N 3/0472; G06N 99/005; G06F 17/30249
See application file for complete search history.

(56) References Cited

U.S. PATENT DOCUMENTS

| | | | | |
|---|---|---|---|---|
| 10,726,264 | B2* | 7/2020 | Sawhney | G06K 9/00664 |
| 10,768,628 | B2* | 9/2020 | Martin | G05D 1/0221 |
| 10,817,752 | B2* | 10/2020 | Kehl | G06K 9/00805 |
| 10,839,264 | B2* | 11/2020 | Albrecht | G06N 3/08 |
| 2019/0354782 | A1* | 11/2019 | Kee | G06N 3/0454 |
| 2019/0361460 | A1* | 11/2019 | Medeiros | G05D 1/0212 |
| 2019/0370606 | A1* | 12/2019 | Kehl | G06T 7/70 |
| 2020/0007781 | A1* | 1/2020 | Aoba | G06N 3/0472 |

FOREIGN PATENT DOCUMENTS

JP 2016-61884 A 4/2016

* cited by examiner

*Primary Examiner* — Amir Alavi
(74) *Attorney, Agent, or Firm* — Canon U.S.A., Inc. IP Division

(57) ABSTRACT

An imaging apparatus configured to estimate information about an imaging setting of the imaging apparatus by using a trained model. The imaging apparatus includes a detection unit configured to detect a first operation for finalizing imaging and a second operation for interrupting imaging of the imaging apparatus in which the imaging setting has been made based on the information estimated by the trained model, and a training unit configured to update a connection weight of the trained model through reinforcement learning by determining, when the first operation is detected by the detection unit, a positive reward, and when the second operation is detected by the detection unit, a negative reward for the information having been estimated when the first or second operation is detected by the detection unit.

21 Claims, 29 Drawing Sheets

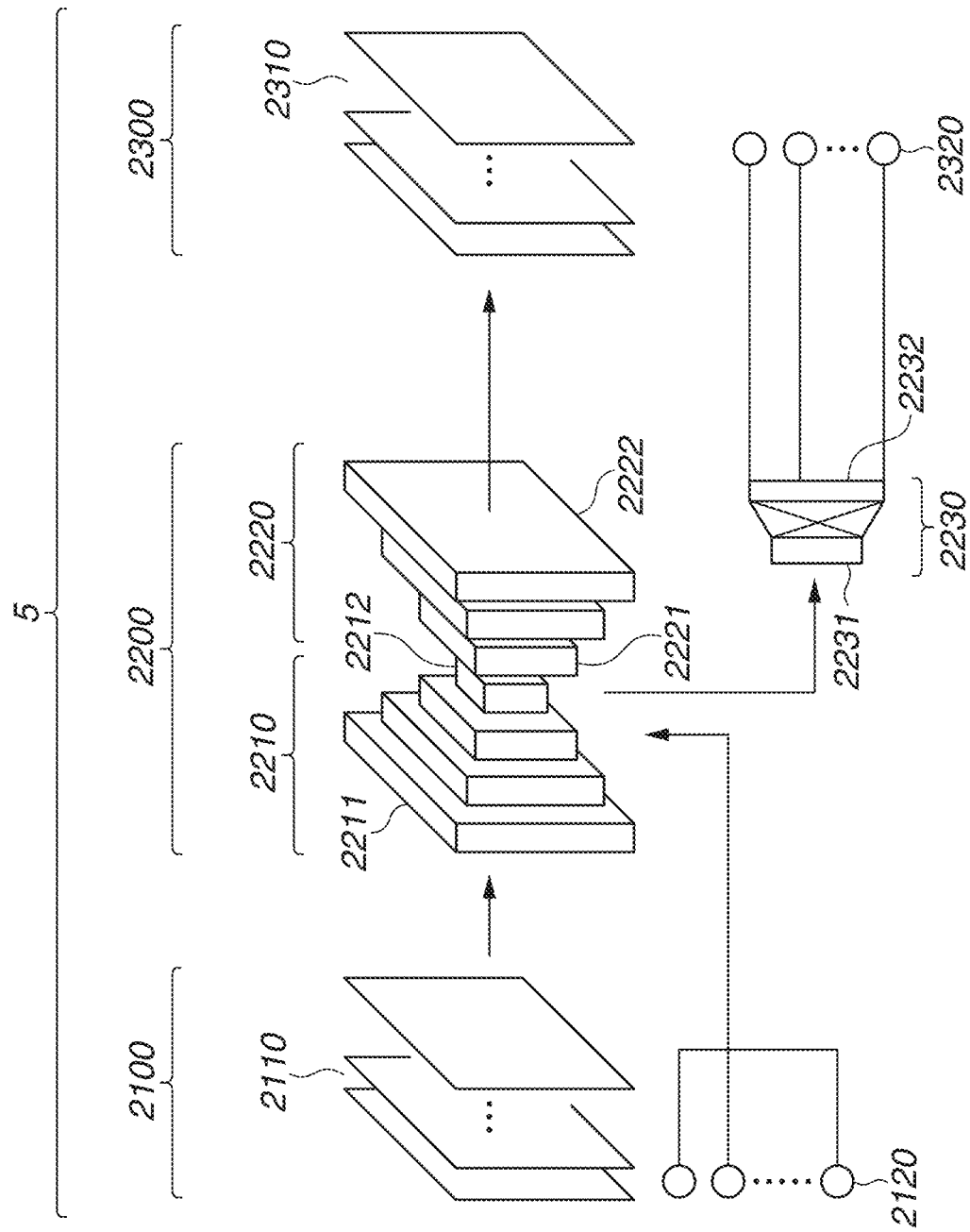

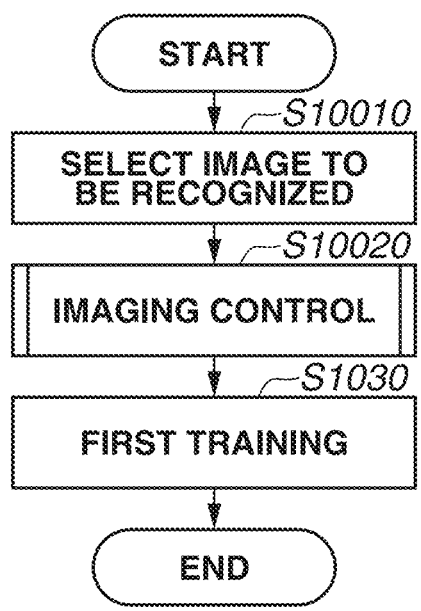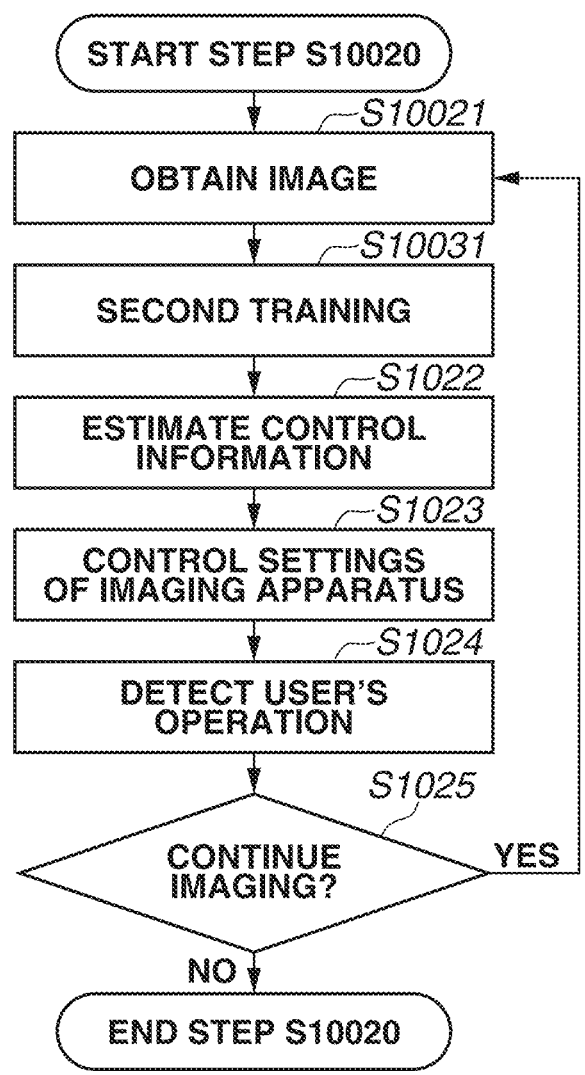

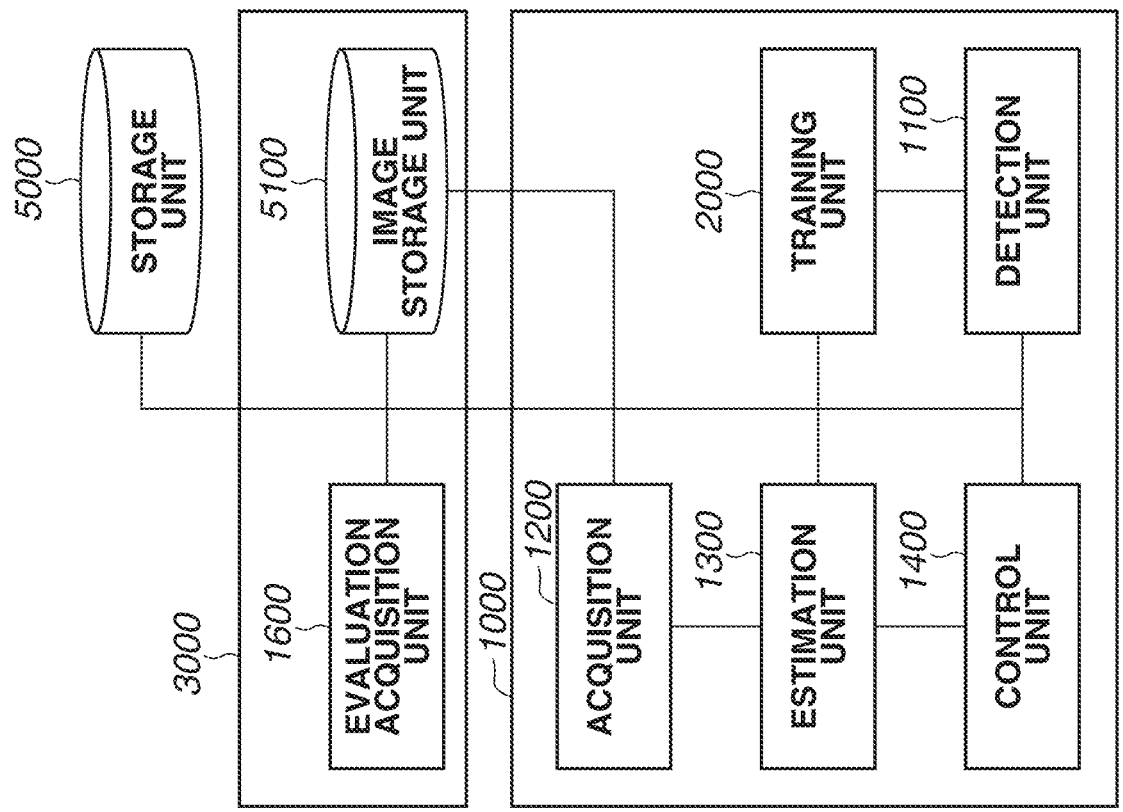
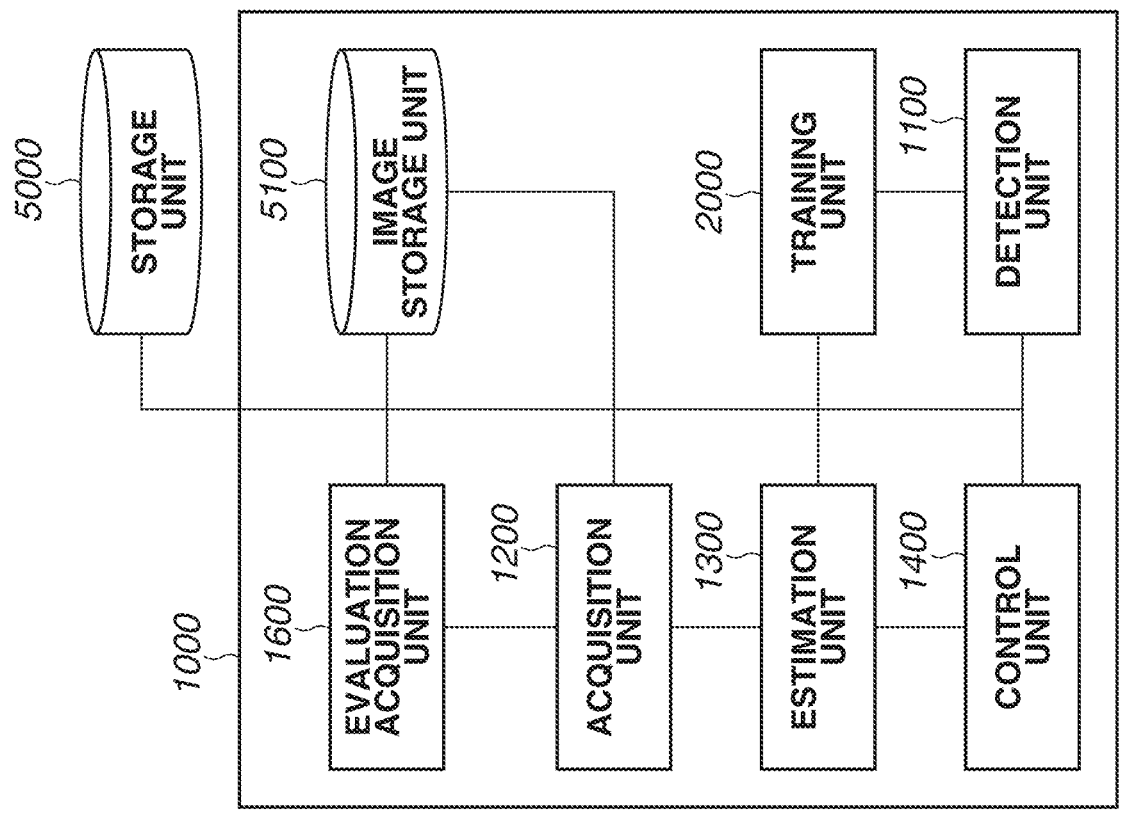

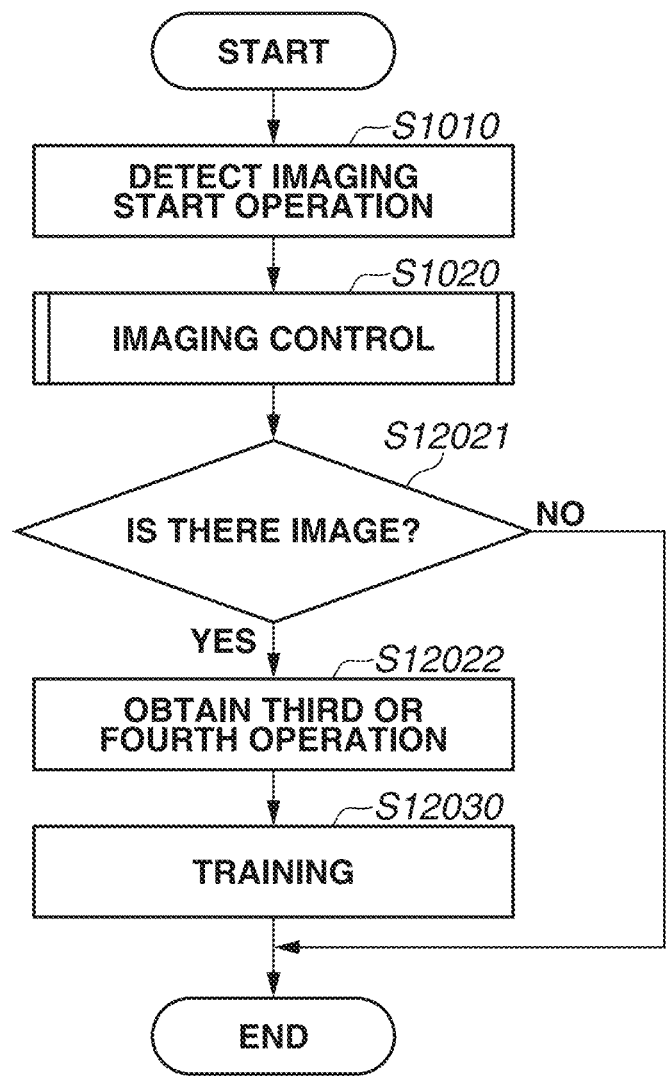

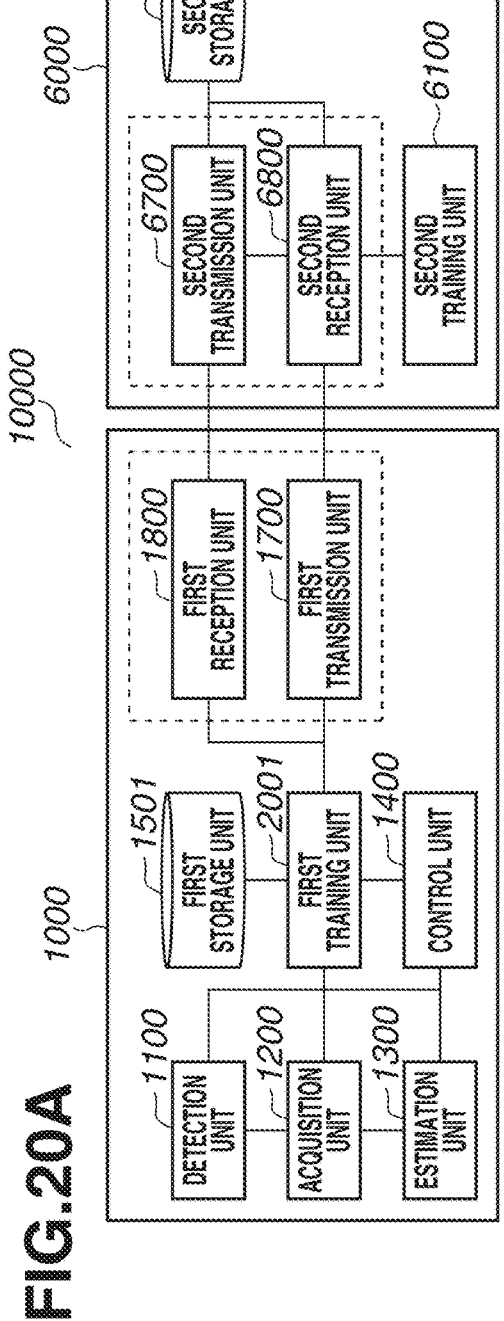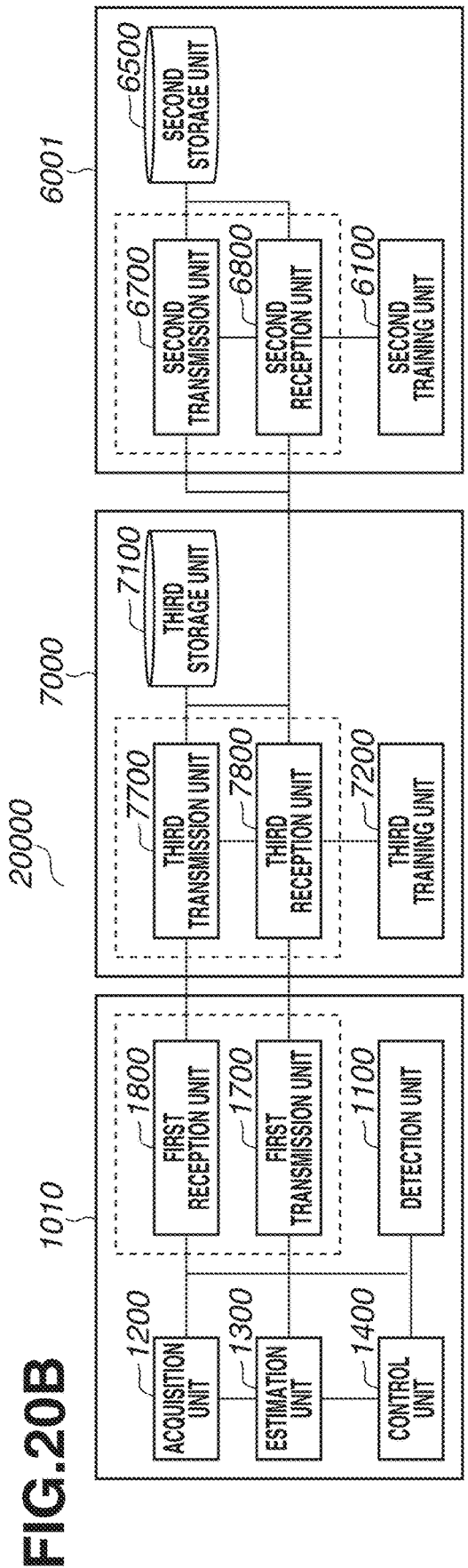

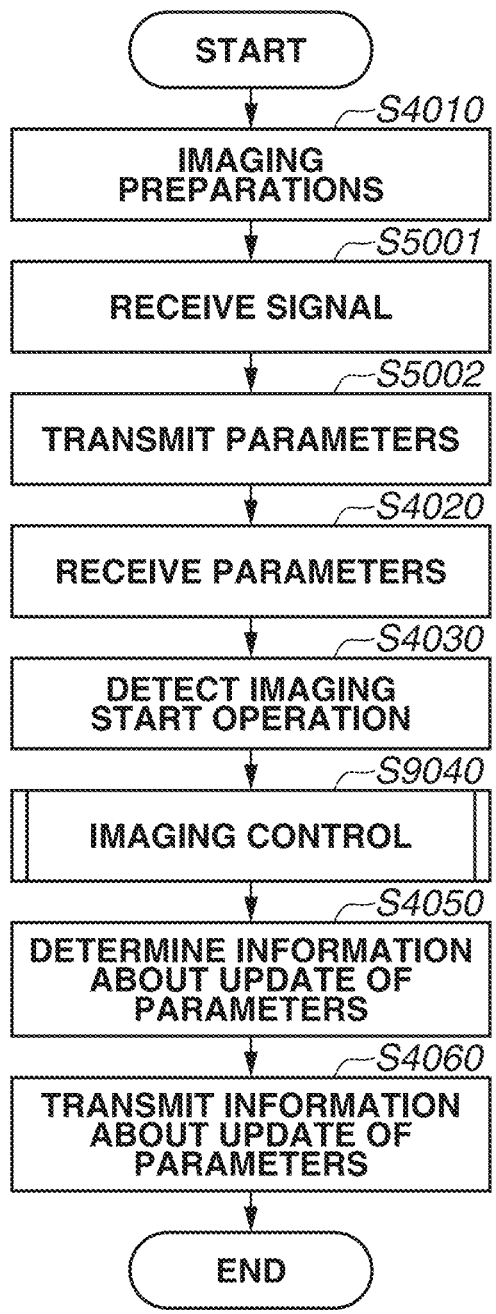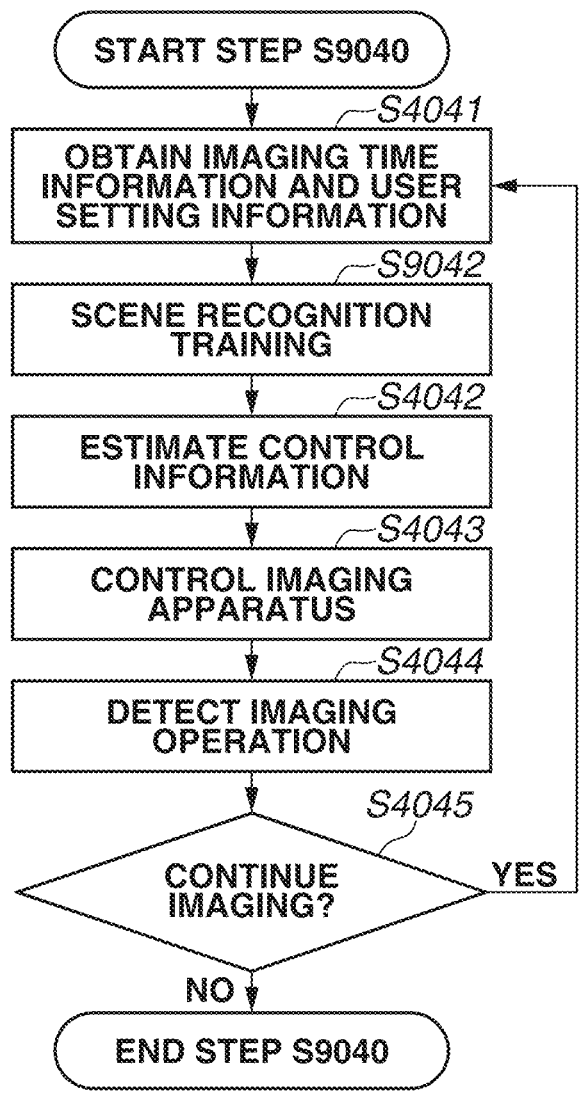

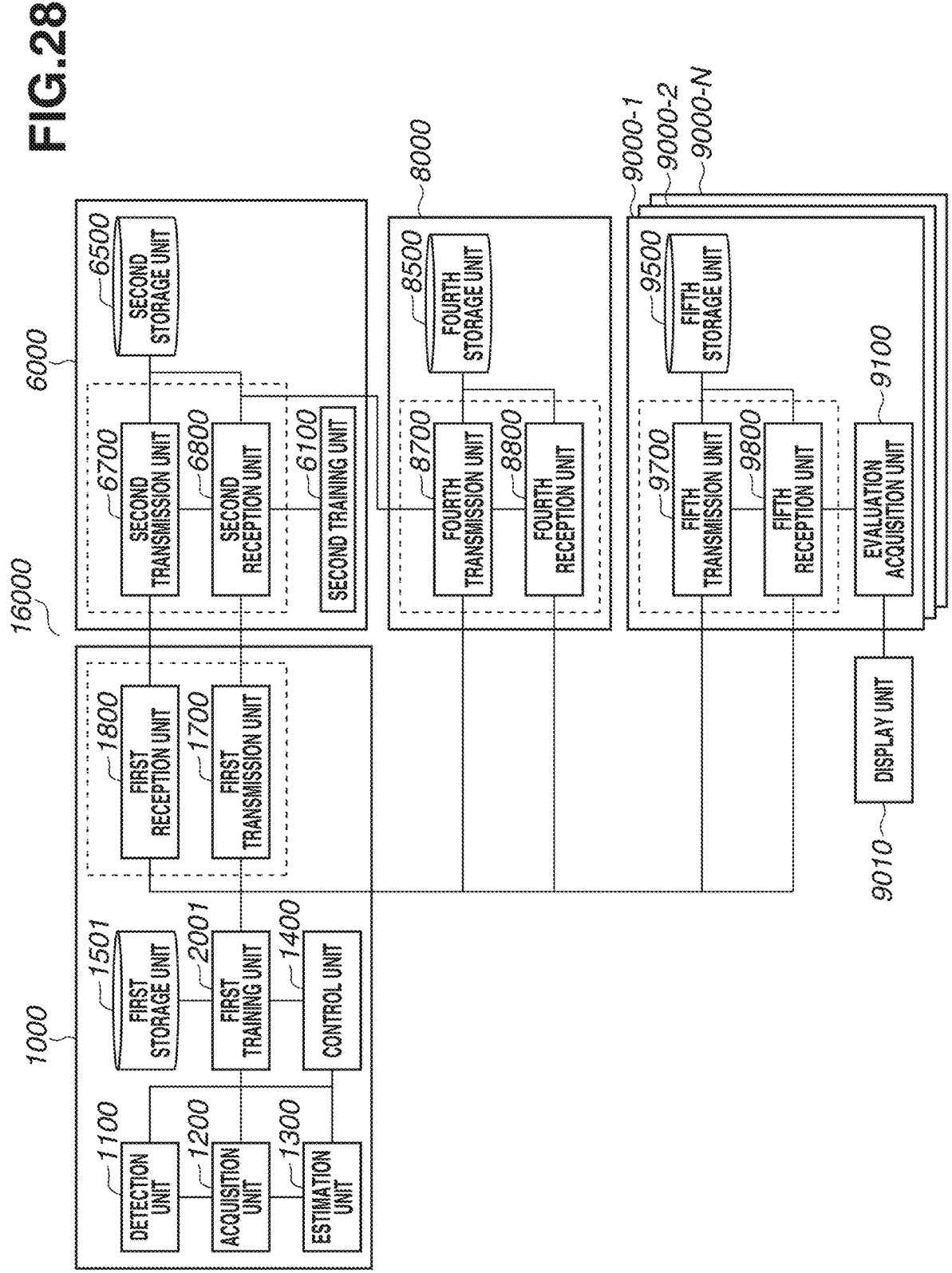

IMAGING APPARATUS FOR CONTROLLING AN IMAGING FUNCTION THAT AFFECTS AN IMAGING RESULT

BACKGROUND OF THE INVENTION

Field of the Invention

The present disclosure relates to a technique for controlling an imaging function of an imaging apparatus.

Description of the Related Art

Typical cameras have various imaging functions affecting an imaging result. Examples of the functions include a focus adjustment function for focusing on an object, an exposure adjustment function for determining the brightness of the imaging result, and an aperture adjustment function for adjusting a degree of blur. Recent digital cameras automatically set such adjustment functions. For example, the automatic setting includes performing human face detection processing and focusing on the resulting detection position.

Japanese Patent Application Laid-Open No. 2016-61884 discusses a method for identifying an object in a focused area during imaging, storing the information in a table, and preferentially focusing on an object stored in the table with high frequency during subsequent imaging.

If various camera settings including a focusing function are automatically controlled, typical rule-based methods can have difficulty providing an imaging result as intended by the user. For example, if an image includes a plurality of objects, the object to be focused on can differ from user to user. The method discussed in Japanese Patent Application Laid-Open No. 2016-61884 can thus fail to perform imaging as intended by the user.

SUMMARY OF THE INVENTION

The present disclosure is directed to providing an imaging apparatus that performs imaging control as intended by the user.

According to an aspect of the present disclosure, an imaging apparatus configured to estimate information about an imaging setting of the imaging apparatus by using a trained model includes a detection unit configured to detect a first operation for finalizing imaging and a second operation for interrupting imaging of the imaging apparatus in which the imaging setting has been made based on the information estimated by the trained model, and a training unit configured to update a connection weight of the trained model through reinforcement learning by determining, when the first operation is detected by the detection unit, a positive reward, and when the second operation is detected by the detection unit, a negative reward for the information having been estimated when the first or second operation is detected by the detection unit.

Further features of the present disclosure will become apparent from the following description of exemplary embodiments with reference to the attached drawings.

BRIEF DESCRIPTION OF THE DRAWINGS

The accompanying drawings are included in this specification, constitute a part of the specification, illustrate exemplary embodiments of the present disclosure, and are used along with a description thereof to explain principles of the present disclosure.

FIG. 5 is a diagram illustrating a convolutional neural network (CNN).

FIGS. 10A and 10B are flowcharts illustrating a flow of processing performed by the imaging apparatus.

FIGS. 11A and 11B are diagrams illustrating functional configuration examples of an imaging apparatus.

FIG. 12 is a flowchart illustrating a flow of processing performed by the imaging apparatus.

FIGS. 20A, 20B, and 20C are block diagrams illustrating functional configuration examples of an information processing system.

FIGS. 23A and 23B are flowcharts illustrating a flow of processing performed by an information processing system.

FIG. 28 is a block diagram illustrating a functional configuration example of the information processing system.

DESCRIPTION OF THE EMBODIMENTS

Figure 1:
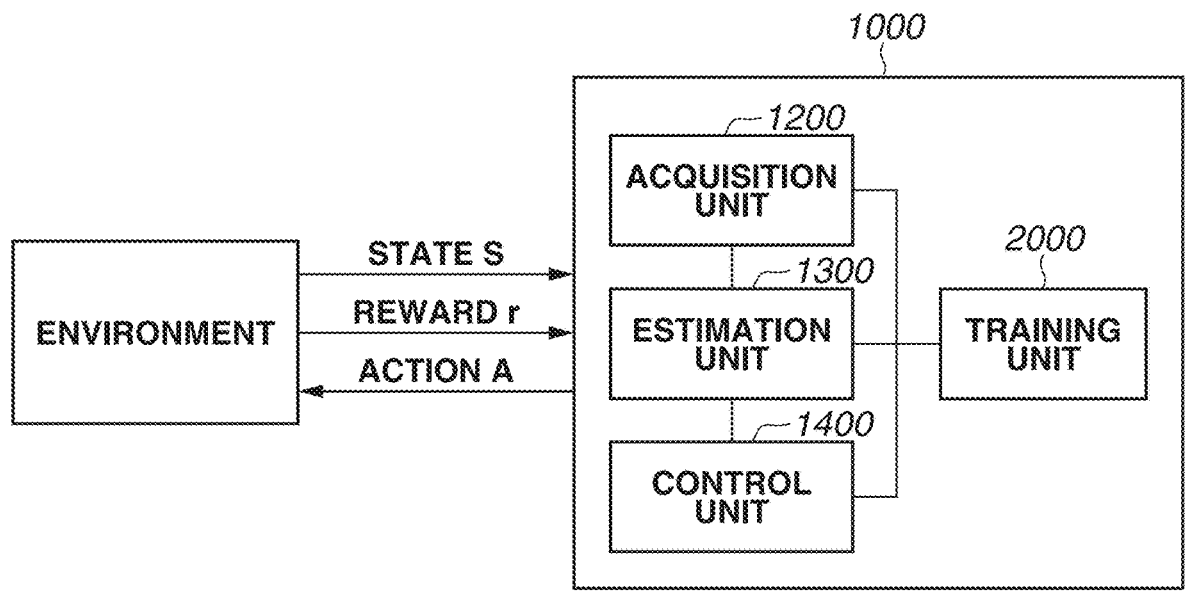
FIGS. 1A and 1B are diagrams illustrating reinforcement learning.

A first exemplary embodiment of the present disclosure will be described below. Before describing exemplary embodiments, reinforcement learning will be described. FIG. 1A illustrates a model for reinforcement learning. In reinforcement learning according to the present exemplary embodiment, an imaging apparatus 1000 in an environment obtains (observes) a current state s at time t by using an acquisition unit 1200. An estimation unit 1300 estimates action a (control instruction to be executed by a control unit 1400) to change settings so that the imaging apparatus 1000 obtains an image suited to the user's preferences. The environment includes a set S of a finite number of states s. For example, the finite number of states s refer to an image the imaging apparatus 1000 is about to capture and the settings of the imaging apparatus 1000. The imaging apparatus 1000 is a learning agent. The imaging apparatus 1000 selects an action from a set of a finite number of types of actions, A, and performs the action, whereby the environment transitions to the next state. In the foregoing example of the imaging apparatus 1000, a control for controlling a focusing position applies to an action. State s refers to a situation in which the imaging apparatus 1000 is.

FIG. 1B illustrates a relationship between states and controls. The set of states, S, of the imaging apparatus 1000 is expressed by a set of states $s_i$ of respective functions i of the imaging apparatus 1000. Take, for example, a focusing function (function index i=1) of the imaging apparatus 1000. State $s_1$ represents the position of a lens (for example, in a movable range of 0 to x with the position of a sensor as a point of origin). Action a refers to the control for the imaging apparatus 1000 to perform. FIG. 1B illustrates an example of the control for the focusing function of the imaging apparatus 1000. The action (control) corresponding to the focusing function will be referred to as being negative if the lens is moved toward the sensor, and positive if the lens is moved away from the sensor. The lens action (control) has three options +1, 0, and −1. The numeral 1 is just an example. Reward r refers to a reward the imaging apparatus 1000 gets from the environment. A reward function for determining reward r is determined by a pair of state $s_t$ and action $a_t$. The reward function returns reward $r_t$ that is obtained in state $s_{t+1}$ if action $a_t$ is taken in state $s_t$ at time t. The imaging apparatus 1000 takes an action (control) that maximizes the reward. Since the user's intuitive operations can be used as rewards, controls tailored to the user can be learned. In the reinforcement learning described in the present exemplary embodiment, training can be easily performed since rewards can be determined from the user's simple operations. For example, control information about the focusing function is determined as follows: Measure the distance to an object. Determine control information for moving the lens from the current lens position to a lens position at which the object comes into focus.

Figure 2:
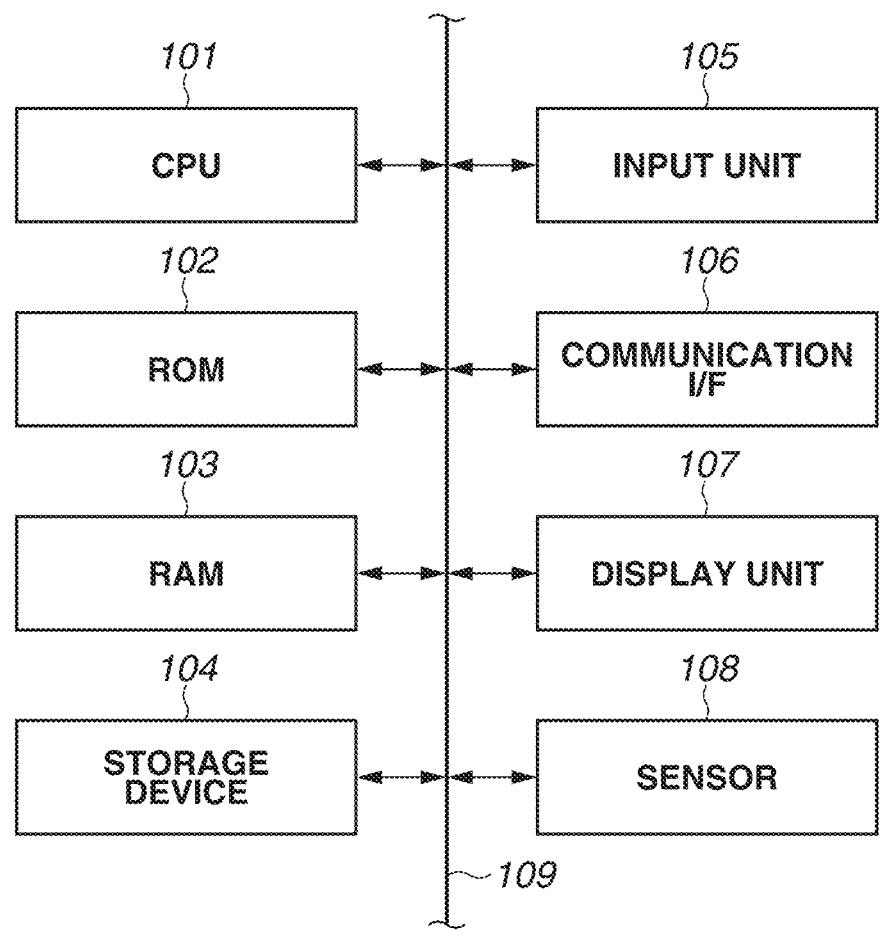
FIG. 2 is a block diagram illustrating a hardware configuration example.

A hardware configuration example of the imaging apparatus 1000 according to the present exemplary embodiment will be described with reference to FIG. 2. A central processing unit (CPU) 101 reads an operating system (OS) and other programs stored in a read-only memory 102 and a storage device 104 and executes the OS and the programs by using a random access memory (RAM) 103 as a working memory. The CPU 101 thereby controls the components connected to a system bus 109 to perform calculations and make logical determinations for various types of processing. Processing for the CPU 101 to execute includes information processing according to the present exemplary embodiment. The storage device 104 includes a hard disk drive and an external storage device. The storage device 104 stores programs and various types of data related to the processing according to the exemplary embodiment. An input unit 105 is an input device for inputting user instructions into the imaging apparatus 1000, such as a camera. Examples of the input unit 105 include a button, a keyboard, and a touch panel. The storage device 104 is connected to the system bus 109 via an interface, such as a Serial Advanced Technology Attachment (SATA) interface. The input unit 105 is connected to the system bus 109 via a serial bus, such as a Universal Serial Bus (USB). Details of the description for the connections are omitted. A communication interface (I/F) 106 communicates with an external apparatus through wireless communication. A display unit 107 is a display. A sensor 108 is an image sensor. Other sensors, such as a distance sensor, a gyro sensor, and an odometry sensor, may also be included.

Figure 3:
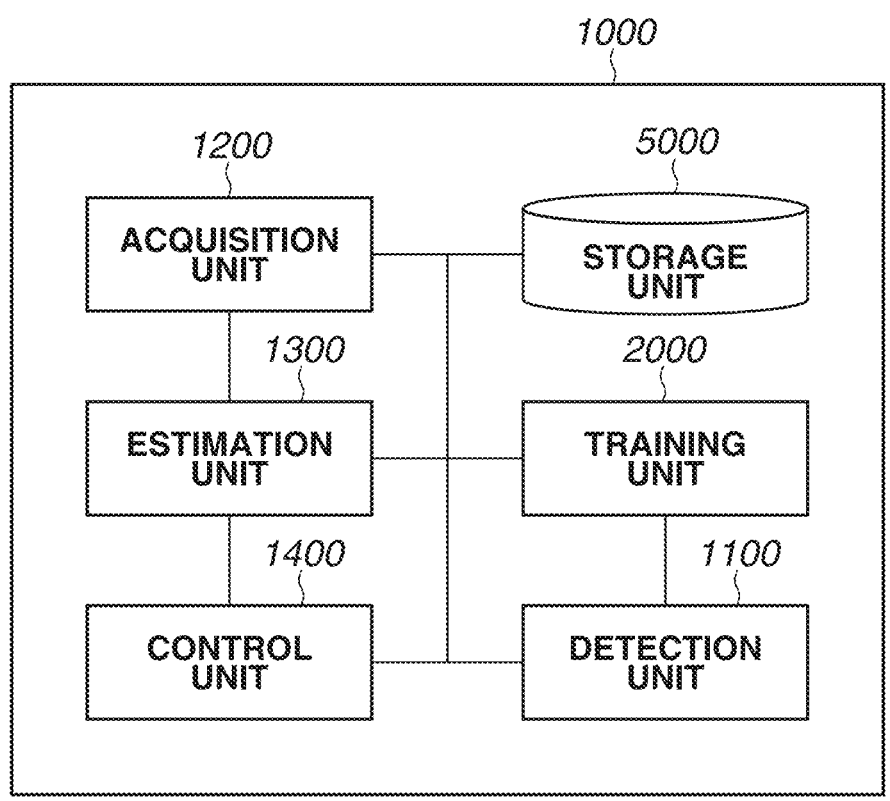
FIG. 3 is a block diagram illustrating a functional configuration example of an imaging apparatus.

A functional configuration example of the imaging apparatus 1000 according to the present exemplary embodiment will be outlined with reference to FIG. 3. Specific details of the processing will be described below. The imaging apparatus 1000 according to the present exemplary embodiment includes a detection unit 1100, the acquisition unit 1200, the estimation unit 1300, the control unit 1400, a training unit 2000, and a storage unit 5000. One of the most typical examples of the imaging apparatus 1000 is a digital camera. The imaging apparatus 1000 may be a camera implemented on a mobile phone or smartphone, or a camera built in a tablet or notebook personal computer (PC). Next, each of the functional components will be outlined. The detection unit 1100 detects operations performed on the imaging apparatus 1000 by the user. The acquisition unit 1200 captures an image including an object, and obtains imaging time information including the image and user setting information about the imaging apparatus 1000. Specific examples of the imaging time information and the user setting information will be described below. The estimation unit 1300 estimates control information for setting imaging functions in capturing an image of an object from the imaging time information and the user setting information obtained by the acquisition unit 1200 based on a trained model. The trained model estimates the control information for setting the imaging functions of the imaging apparatus 1000 based on a captured image. The control unit 1400 controls the settings of the imaging apparatus 1000 based on the control information estimated by the estimation unit 1300. The detection unit 1100 detects a first operation for finalizing imaging and a second operation for interrupting imaging. The training unit 2000 performs reinforcement learning with rewards determined based on the operations detected by the detection unit 1100, and updates parameters of the trained model. The parameters of the trained model updated by training are stored in the storage unit 5000. The storage unit 5000 also stores images from when a start of imaging is detected to when the user makes a predetermined operation (operation for pressing a shutter button to finalize imaging, or operation for releasing the shutter button to interrupt imaging). The training unit 2000 and the storage unit 5000 may be included in an information processing apparatus outside the imaging apparatus 1000. For example, the training unit 2000 and the storage unit 5000 may be included in a PC, a portable terminal, or a server outside the imaging apparatus 1000. If the training unit 2000 is located outside the imaging apparatus 1000, the parameters of the estimation unit 1300, the imaging time information, the user setting information, and information about the user operations obtained in the detection step are transmitted to the training unit 2000 outside the imaging apparatus 1000 in a wireless or wired manner, and processed by the training unit 2000.

FIGS. 16A to 16D illustrate examples of imaging control performed by the imaging apparatus 1000. Assume a situation in which a photographer who is the user captures an image of a landscape 7 and an object 6 in FIG. 16A by using the imaging apparatus 1000. An image 160 and an image 161 are live-view images displayed on the imaging apparatus 1000. Suppose that the setting value of a setting S1 (for example, an exposure of +1) is applied to the image 160 so that the image 160 has a slightly higher brightness than that to the human eye. Suppose also that the setting value of a setting S4 (for example, an exposure of −1) is applied to the image 161 so that the entire image 161 is darker than the image 160. The resulting images 160 and 161 thus differ depending on the setting of the imaging apparatus 1000. Now, suppose that the photographer desires to take a picture like illustrated as an image 162. Suppose that the image 162 is an image obtained under the application of the setting value of a setting S3 (for example, an exposure of 0) and has brightness intermediate between the images 160 and 161. The photographer finalizes imaging at timing when a live-view image like the image 162 is displayed.

Figure 16A:
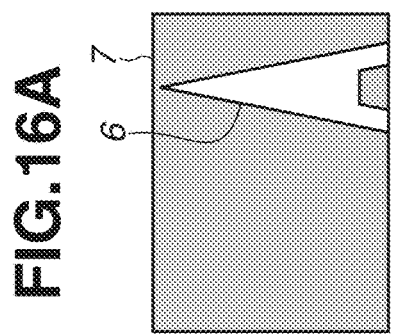
FIGS. 16A, 16B, 16C, and 16D are diagrams illustrating imaging controls performed by an imaging apparatus.
Figure 16B:
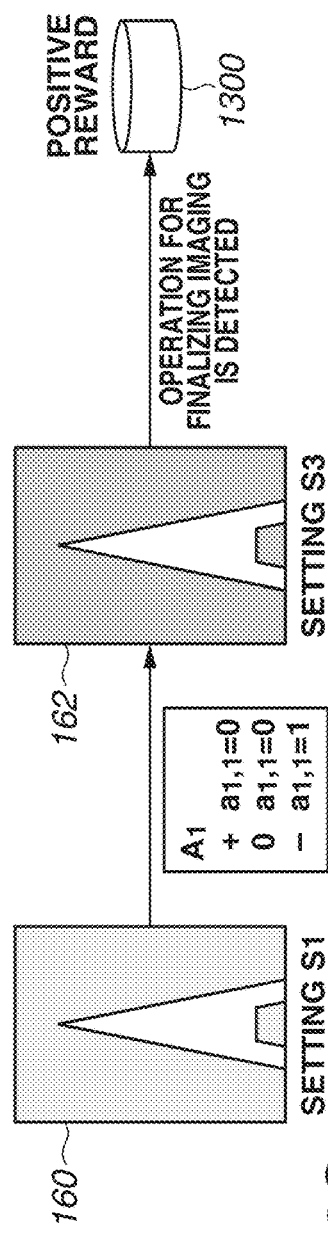
Figure 16C:
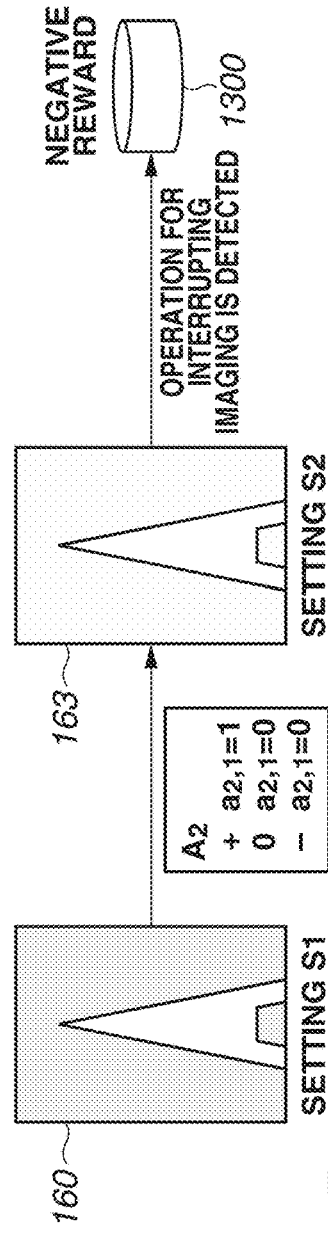
Figure 16D:
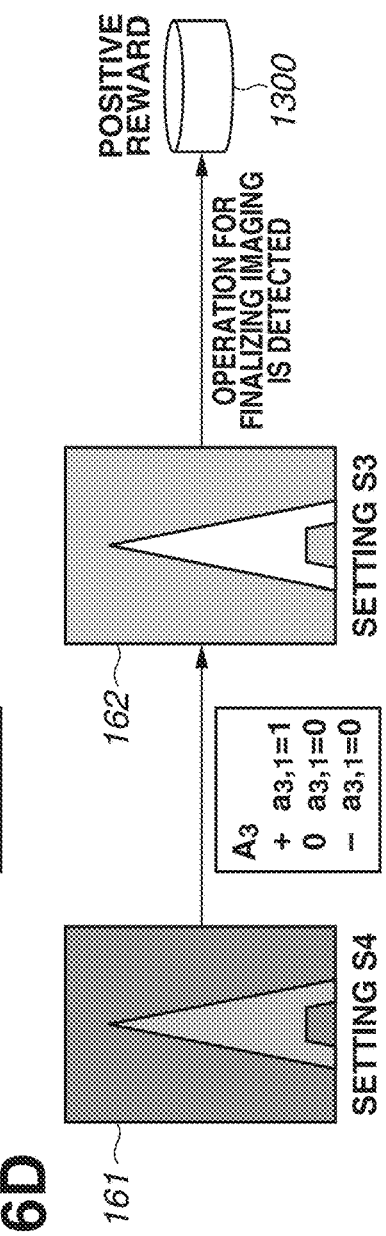

The estimation unit 1300 includes the trained model of reinforcement learning for estimating the imaging settings of the imaging apparatus 1000. The trained model outputs various controls $A_n$. FIG. 16B illustrates a case where the imaging apparatus 1000 selects control $A_1$ to change the setting (state) S1 with which the image 160 is obtained in a negative direction into the setting (state) S3 with which a live-view image such as the image 162 is generated. The imaging apparatus 1000 here detects the photographer's pressing operation on the shutter button, and finalizes imaging. If the shutter button being pressed is detected, the trained model is given a positive reward and thereby trained for the control $A_1$. With such a reward, the trained model can learn that the control $A_1$ with which the setting S3 is obtained is desirable for the image 160. Similarly, FIG. 16D illustrates a case where the image 161 is obtained and control $A_3$ to increase exposure (+) is selected. The photographer presses the shutter button to finalize imaging. FIG. 16C illustrates a case where control $A_2$ to increase exposure (+) is selected from among the output results of the estimation unit 1300. Here, a setting S2 (for example, an exposure of +2) is applied, as in an image 163, resulting in an entirely bright image. Here, the photographer once releases the finger from the shutter button to interrupt imaging. If the release of the shutter button by the photographer is detected, the trained model is given a negative reward and thereby trained not to select control $A_2$. Such training is repeated to update the parameters of the trained model through reinforcement learning, whereby the imaging apparatus 1000 can learn imaging controls.

Figure 4A:
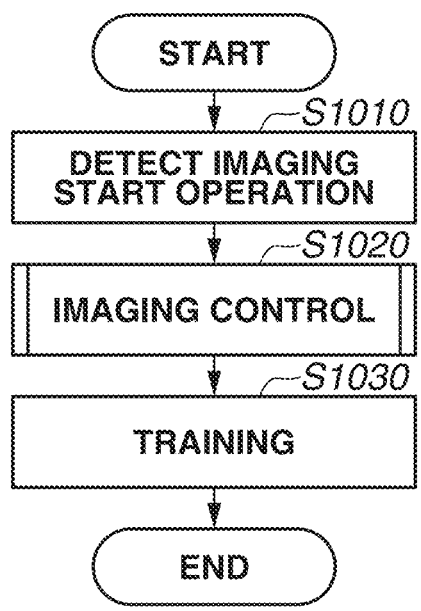
FIGS. 4A and 4B are flowcharts illustrating a flow of processing performed by the imaging apparatus.
Figure 4B:
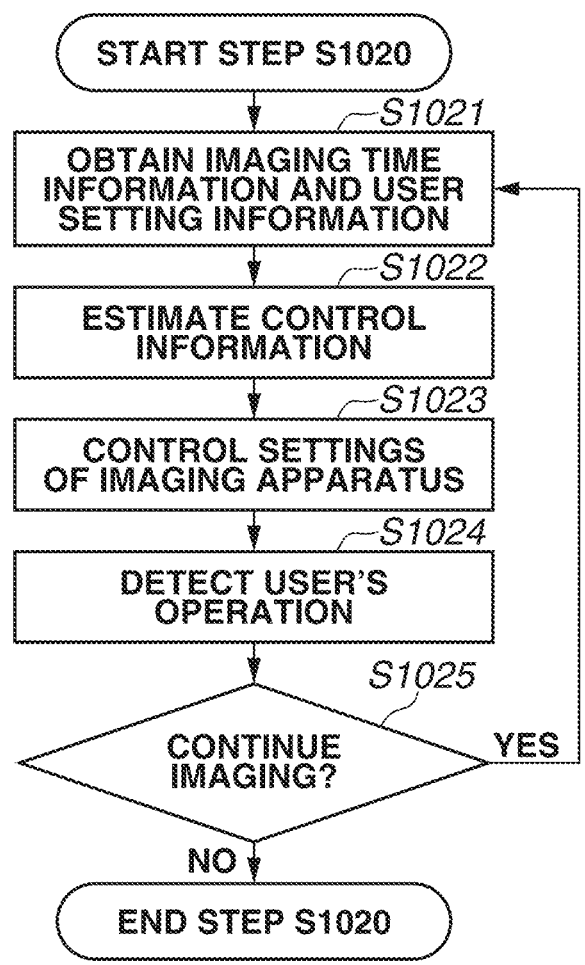

A detailed description will be given below with reference to the flowchart of FIG. 4A illustrating a flow of processing performed by the imaging apparatus 1000. The imaging apparatus 1000 does not necessarily need to perform all the steps described in the flowchart. The processing illustrated in the flowcharts of FIGS. 4A and 4B is performed by the CPU 101 of FIG. 2 that is a computer based on a computer program stored in the storage device 104.

In step S1010, the detection unit 1100 detects an imaging start operation. The imaging apparatus 1000 detects the imaging start operation by the user, and the processing proceeds to step S1020. Examples of the imaging start operation performed by the user include starting to half-press the shutter button of the camera. In step S1020, the imaging apparatus 1000 initializes an imaging time to t=1. The estimation unit 1300 reads the parameters (connection weights of respective layers of a neural network to be described below) of the trained model for estimating control information from the storage unit 5000.

Step S1020 includes steps S1021, S1022, S1023, S1024, and S1025. Such steps are repeated while the shutter button is half-pressed by the user. Steps S1021 to S1025 will be described with reference to FIG. 4B.

In step S1021, the acquisition unit 1200 obtains imaging time information that includes an image, and user setting information that is set by the user before imaging. The image is stored in the imaging apparatus 1000 as time-series data. There can be various types of imaging time information and user setting information. Most typical imaging time information includes an object's image obtained from the image sensor at a given time and images at previous and subsequent times. The acquisition of time-series images enables the trained model to be trained with appropriate settings for the scene each time. In addition, various types of information obtained from the imaging apparatus 1000 can also be handled. Examples thereof include depth information obtained from an image plane phase difference, a contrast map obtained by calculation of the magnitude of contrast in local areas of the image area by area, and a focus position of a lens. A By value that is an absolute brightness value of the entire image can also be handled as imaging time information. Such pieces of information are stored in a storage unit (not-illustrated) during imaging, and used as input information for the trained model during training. Various recognition results obtained by using image information as an input may be used as a type of imaging time information. For example, a detection result of a face or human body, a detection result of a specific object, such as an animal, a vehicle, and an aircraft, and image recognition result may be handled as imaging time information. The user setting information is information about settings made by the user in starting an imaging step. Examples thereof include an imaging mode (such as a macro mode, a night scene mode, and a sport mode), an exposure setting, and a white balance mode selected by the user.

In step S1022, the estimation unit 1300 estimates control information for controlling the settings of the imaging-related functions of the imaging apparatus 1000 (in the case of the focusing function, the lens position) from the imaging time information and the user setting information based on the trained model. Various pieces of control information can be set aside from the control information about a focus operation. Examples include an exposure setting value and a gain adjustment value. The method for estimating the control information is not limited in particular as long as the imaging time information and the user setting information can be changed in step S1030 (described below). To be specific, an example where the control information is estimated by using a convolutional neural network (CNN), which is a trained model, will be described. The use of a trained model for the estimation unit 1300 has the following advantages. By using a trained model that is trained in advance with a professional photographer's imaging operations, a photographer can capture images in such a state that the imaging-related functions are optimally set, even with initial settings. In addition, the parameters of the trained model are updated by only imaging operations easy to the photographer, and settings appropriate for the specific photographer can thereby be learned.

FIG. 5 illustrates an example of the estimation unit 1300 that estimates the control information for setting the imaging-related functions by using a CNN. A network structure 5 is a CNN. The estimation unit 1300 including the CNN includes an input layer 2100. The input layer 2100 includes a map input section 2110 for inputting imaging time information corresponding to the size of an input image, and a scalar/vector input section 2120 in which pieces of imaging time information and user setting information given to the entire image as scalar values or vector values are listed. A convolutional layer 2200 is a CNN that includes a convolutional layer 2210 including at least one layer, a deconvolutional layer 2220 including at least one layer, and a fully connected layer 2230 including at least one layer. Such layers of the CNN include at least one or more elements each. The layers inside the convolutional layer 2210 are convolutionally connected in order. A final layer 2212 of the convolutional layer 2210 is deconvolutionally connected to a bottommost layer 2221 of the deconvolutional layer 2220. The layers inside the deconvolutional layer 2220 are deconvolutionally connected in order. All the elements of the final layer 2212 of the convolutional layer 2210 are fully connected to all the elements of a bottommost layer 2231 of the fully connected layer 2230. The fully connected layer 2230 includes a plurality of layers, where the layers are fully connected in order. The connections between the layers are weighted by connecting weights. The connection weights are the parameters of the CNN, and read from the storage unit 5000 when step S1010 is started. The parameters of the CNN are updated by training processing performed in step S1030 (described below). The initial values of the parameters may be given at random, or may be previously trained with values given based on a rule. Values resulting from training by a professional photographer may be given as the initial values. In such a case, any user can take a picture like a pro does. The map input section 2110 is convolutionally connected to a bottommost layer 2211 of the convolutional layer 2210. The elements of the scalar/vector input section 2120 are input to elements of the layers of the convolutional layer 2210 as bias signals.

Various types of imaging time information can be input to the map input unit 2110. Examples include a red-green-blue (RGB) image, a pixel-by-pixel captured image signal (raw image) before development processing, depth information about an image, a map of object detection scores obtained by an object detector, and a contrast map obtained from variance values in local areas of an image. Various types of imaging time information can be input to the scalar/vector input section 2120 as well. Examples include an absolute brightness value (By value) of an entire image, a recognition result obtained by an image classifier, and the focus position of a lens. User setting information, such as the imaging mode, the exposure setting, and a white balance coefficient of the camera can also be input to the scalar/vector input section 2120. The present disclosure is not limited to any of the combinations of such various types of imaging time information and user setting information.

Figure 6:
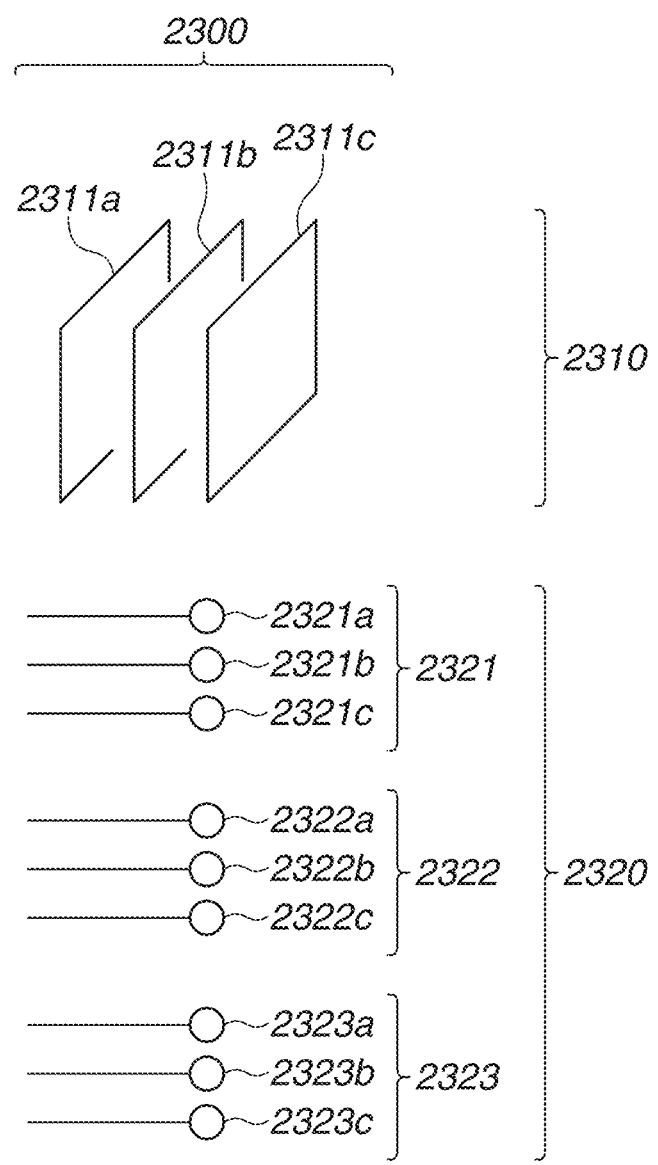
FIG. 6 illustrates an output layer of the CNN.

FIG. 6 illustrates an example of the output layer of the CNN according to the present exemplary embodiment. An output layer 2300 includes a map output section 2310 and a scalar/vector output section 2320. The map output section 2310 outputs output signals (control information) in the form of maps corresponding to the size of the input image. The scalar/vector output section 2320 outputs output signals in the form of scalar values or vector values with respect to the input image. The maps of the map output section 2310 are deconvolutionally connected to a final layer 2222 of the deconvolutional layer 2220. The elements of the scalar/vector output section 2320 receive the signals of a final layer 2232 of the fully connected layer 2230, and output the received signals. The map output section 2310 outputs, for the options of controls of the imaging apparatus 1000, the probabilities at respective positions on the image. For example, suppose, as illustrated in FIG. 6, that three maps 2311a, 2311b, and 2311c are provided to stochastically define a focus operation as an output of the map output section 2310. The maps 2311a, 2311b, and 2311c are maps for operations to move the focus to a near side, stop the focus, and move the focus to a far side, respectively. The output values of the maps 2311a, 2311b, and 2311c stochastically express the options of the control operation about what position on the image is set as a focus control point and which to move a focusing lens motor to, the near side or the far side. If a map output is peaky, the control operation corresponding to the peak is selected with higher reliability. If a map output has a broad distribution of similar values, the control operation is more broadly selected at random.

The scalar/vector output section 2320 outputs the probabilities for options concerning controls of the imaging apparatus 1000 independent of the position on the image. For example, suppose, as illustrated in FIG. 6, that exposure control terminals 2321a to 2321c, gain adjustment terminals 2322a to 2322c, and aperture adjustment terminals 2323a to 2323c are provided as the outputs of the scalar/vector output section 2320. The three terminals 2321a, 2321b, and 2321c for exposure control correspond to operations to increase, not change, and decrease exposure time, respectively. The three terminals 2322a, 2322b, and 2322c for gain adjustment control correspond to operations to increase, not change, and decrease the gain of the image sensor, respectively. The three terminals 2323a, 2323b, and 2323c for aperture adjustment control correspond to operations to narrow, not change, and widen the lens aperture from the current state, respectively.

Figure 7A:
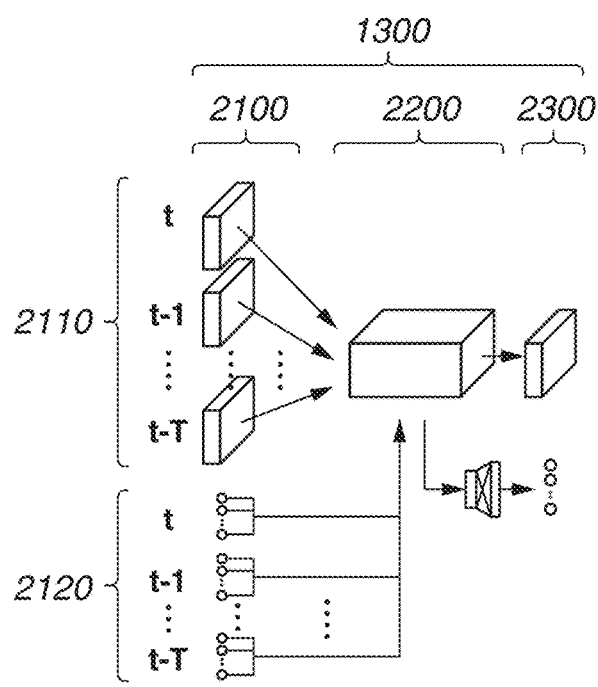
FIGS. 7A and 7B illustrate configuration examples of a CNN for inputting pieces of information at a plurality of times.
Figure 7B:
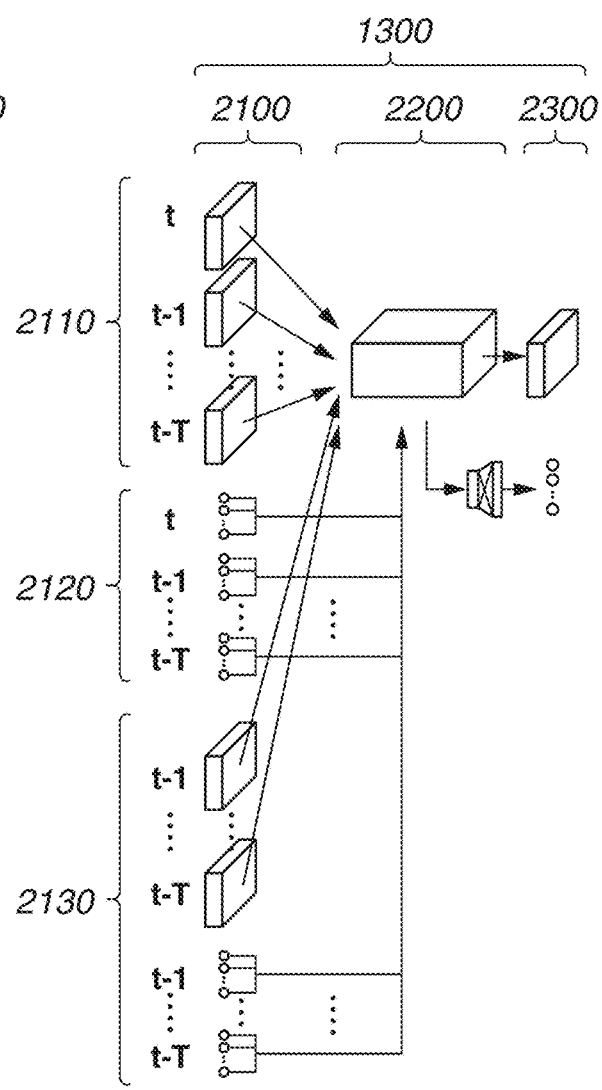

FIGS. 7A and 7B are diagrams for describing configuration examples of a CNN for inputting imaging time information at a plurality of times. Imaging time information and user setting information at a plurality of times in step S1020 may be input to the input layer 2100 as illustrated in FIG. 7A. For example, imaging time information and user setting information at the current time t is denoted by $s_t$. Then, pieces of information $s_t, s_{t-1}, \ldots s_{t-T}$ back to T frames before, or time (t−T), may be used as the inputs. The output results (control information) of output layers from immediately before, or time (t−1), to time (t−T) may be given to the input layer 2100 as illustrated in FIG. 7B. Assuming that the state of the input layer 2100 at the current time t is $s_t$, as illustrated in FIGS. 7A and 7B, the output of the map output section 2310 concerning a kth operation of an ith function will be denoted by $Q_{i,k}(s_t, (x, y))$. The coordinates (x, y) are coordinates on a map, and correspond to a position on an image. For example, suppose that a function index i=1 is assigned to the maps 2311a, 2311b, and 2311c intended for focus operations. The maps 2311a, 2311b, and 2311c for moving the focus to the near side, not moving the focus, and moving the focus to the far side are assigned k=1, 2, and 3, respectively. In such a case, for example, an output concerning a control to move the focus to the near side with a focus control position at (x, y) is denoted by $Q_{1,1}(s_t, (x, y))$.

The output layer 2300 described above is just an example, and the present disclosure is not limited to the foregoing combination. With the state of the input layer 2100 at the current time t as $s_t$, control information about an hth operation of a jth function in the scalar/vector output section 2320 will be denoted by $Q_{j,h}(s_t)$. For example, suppose that the function index j=1 is assigned to an exposure control operation. The terminals 2321a, 2321b, and 2321c for increasing, not changing, and decreasing exposure are assigned h=1, 2, and 3, respectively. In such a case, for example, the output concerning the control for increasing exposure is expressed as $Q_{1,1}(s_t)$. The imaging time information and user setting information at the current time t is input to the input layer 2100. The information $s_t$ is transmitted through the CNN, and output signals $Q_{i,k}(s_t, (x, y))$ and $Q_{j,h}(s_t)$ are obtained from the map output section 2310 and the scalar/vector output section 2320 of the output layer 2300.

In step S1023, the control unit 1400 controls the settings of the imaging apparatus 1000 based on the control information from the estimation unit 1300. The probability that a control action k at position (x, y) is selected as a control operation $a_{t,i}$ of a function i of the map output section 2310 at the current time t is given by the following:

$$P(a_{t,i} = \{(x, y), k\}) = \frac{Q_{i,k}(s_t, (x, y))}{\sum_{k,x,y} Q_{i,k}(s_t, (x, y))}. \quad (1)$$

Similarly, the probability (control action probability) that a control action h is selected as a control operation $a_{t,j}$ of a function j of the scalar/vector output section 2320 at the current time t is given by the following:

$$P(a_{t,j} = h) = \frac{Q_{j,h}(s_t)}{\sum_{h} Q_{j,h}(s_t)}. \quad (2)$$

In such a manner, the operations for the respective functions are selected with the probabilities proportional to the values of the output layer 2300, and control operations, such as a focus operation, an exposure control, a gain adjustment, and an aperture adjustment are performed. Since the controls are stochastically selected, a single action can be determined even if contradictory pieces of control information are output.

In step S1024, the detection unit 1100 detects an operation performed by the user. In the present exemplary embodiment, the detection unit 1100 detects an operation by which the user finalizes imaging as a first operation. Here, an operation that the user fully presses the shutter button is detected as the operation for finalizing imaging, or the first operation. The shutter button of the imaging apparatus 1000 has a fully-pressed state (first state), a released state (second state), and a half-pressed state. An operation for interrupting imaging is referred to as a second operation. The detection unit 1100 detects an operation by which the user cancels the half-pressing of the shutter button as the second operation. By detecting such intuitive operations of the user, rewards can be determined without a special operation. The user's operations are not limited thereto. For example, if the imaging apparatus 1000 is configured to display a shutter button on its touch panel, the following operations can be performed. The imaging start operation in step S1010 is performed by the object displayed on-screen being touched. An instruction to perform imaging is given by an operation for touching the shutter button displayed on-screen. An instruction to cancel imaging is given by an operation for touching a cancel button.

In step S1025, the detection unit 1100 determines whether to continue imaging. If the detection unit 1100 detects the state where the shutter button is half-pressed, the detection unit 1100 determines to continue imaging (YES in step S1025). The detection unit 1100 adds one to the imaging time so that t←t+1, and the processing returns to step S1021. If the detection unit 1100 detects an imaging execution command, i.e., that the shutter button is fully pressed (first operation), or if the detection unit 1100 detects an imaging interruption command, i.e., that the finger is released from the shutter button (second operation), the imaging apparatus 1000 ends imaging and the processing proceeds to step S1030.

In step S1030, the training unit 2000 determines a positive reward if the first operation for finalizing imaging is detected, and determines a negative reward if the second operation for interrupting imaging is detected. The training unit 2000 further updates the parameters of the trained model with the determined reward. In other words, the training unit 2000 trains the trained model for the imaging control based on the user operation detected by the detection unit 1100. If the imaging execution command (first operation) is issued by the user in step S1024, the training unit 2000 gives a "reward" (positive reward) since the imaging step so far is considered to be right. If the imaging interruption command (second operation) is issued by the user, the training unit 2000 gives a "penalty" (negative reward) since the user considers that the imaging step so far is not appropriate. In such a manner, the training unit 2000 performs reinforcement learning about the control operation performed during the imaging step of the imaging apparatus 1000. Since a reward is thus determined based on the user's intuitive operations, training can be easily performed without a special procedure for setting the reward.

Suppose that the time of the last frame at the end of imaging is $t_0$. For each piece of control information at time $t=t_0, t_{0-1}, \ldots t \ldots 1$ during the execution of step S1020, the map output section 2310 and the scalar/vector output section 2320 obtain respective action values Q' as follows:

$$Q'_{i,k}(s_t,(x,y))=Q_{i,k}(s_t,(x,y))+\alpha\{r_{t+1}+\gamma Q_{i,k}(s_{t+1},(x,y))-Q_{i,k}(s_t,(x,y))\}, \text{ and} \quad (3)$$

$$Q'_{j,h}(s_t)=Q_{j,h}(s_t)+\alpha\{r_{t+1}+\gamma Q_{j,h}(s_{t+1})-Q_{j,h}(s_t)\}. \quad (4)$$

Here, (x, y) and k represent the position and operation of the control operation $a_{t,i}$ selected for the function i of the map output section 2310 at time t. Symbol h indicates the operation of the control operation $a_{t,j}$ selected for the control function j of the scalar/vector output section 2320 at time t.

If a "reward" is given by the user's operation detected in step S1024, $r_1$ has a positive value, such as 1. For t other than 1, $r_t$ is uniformly 0. If a "penalty" is given for the series of imaging controls, $r_1$ has a negative value, such as −1. For t other than 1, $r_t$ is uniformly 0. Symbol γ indicates a coefficient (discount rate; 0<γ≤1) for temporally retrospectively attenuating the effect on each operation. For example, γ is set to 0.9. If the resulting values for Q's are given as rewards to the respective output sections, errors with respect to the functions i and j and the control actions k and h are expressed by the following equations:

$$L_{i,k}=(Q_{i,k}(s_t,(x,y))-Q'_{i,k}(s_t,(x,y)))^2, \text{ and} \quad (5)$$

$$L_{j,h}=(Q_{j,h}(s_t)-Q'_{j,h}(s_t))^2. \quad (6)$$

Based on such error functions, the entire CNN is trained through a gradient descent method. The parameters, or connection weights, of the CNN are updated through the training. The updated parameters are stored in the storage unit 5000. Optional images captured in step S1020 may be used for training. For example, the storage unit 5000 stores images obtained between a first time when imaging is started and a second time when the first operation or the second operation is detected by the detection unit 1100. The training unit 2000 updates the parameters of the trained model by giving rewards for the images obtained between the first and second times. Since images associated with a plurality of times in the imaging step are used for training, the functions can be set in a short time.

In the present exemplary embodiment, the parameters for the trained model are updated by the user selecting either to press the shutter button and finalize imaging or to interrupt imaging. The imaging apparatus 1000 according to the present exemplary embodiment thus becomes able to obtain control operations closer to desired operations by repeating imaging. In the present exemplary embodiment, imaging-interrupted images are also used to update the trained model by the determination of negative rewards. Reinforcement learning can thus be performed even for the settings with which imaging is not performed.

If the user can determine that sufficient training has been done in step S1030, the user may make a setting not to perform training. For example, the user gives a predetermined instruction to the imaging apparatus 1000 (for example, the user selects a training stop instruction by using a graphical user interface (GUI) and gives the instruction to the imaging apparatus 1000), and the training unit 2000 suppresses parameter update accordingly. If, in a certain period, the control action probability of Eq. (2) is higher than a predetermined threshold or the second operation is detected less than a predetermined number of times, the training unit 2000 may switch to a no-training mode since the reinforcement learning is considered to have converged. Specifically, the storage unit 5000 stores images captured in the past, control information, and control action probabilities as history information. If, based on the history information, the control action probabilities are higher than a predetermined threshold, the training unit 2000 suppresses the update of the parameters of the trained model. In such a manner, a trained model for performing imaging controls as intended by the user can be obtained. On the other hand, an encounter with a new object or scene during suspension of training can lower the precision of the trained model. In such a case, the user may turn the training mode on again. The training mode may be automatically resumed when a new object or scene is recognized. For example, if, in a predetermined period (such as an operation time of one hour or more), the detection unit 1100 detects the second operation a predetermined number of times or more or the control action probability of Eq. (1) or (2) falls below a predetermined threshold, the training unit 2000 resumes training. In other words, the training unit 2000 updates the parameters of the trained model. By contrast, if the first operation is detected a predetermined number of times or more in the predetermined period, the training unit 2000 may determine that sufficient training has been done, and may suppress the update of the parameters of the trained model. If the first operation is detected a predetermined number of times or less in the predetermined period, the training unit 2000 resumes updating the parameters of the trained model since not-learned scenes may be increasing. In such a manner, imaging controls intended by the user can be learned even in a changing environment.

To control the settings of the imaging functions more quickly, a reward may be added by taking a needed time into account based on the state of the imaging apparatus 1000 during step S1020. A description thereof will be provided with reference to the flowcharts of FIGS. 4A and 4B. In step S1010, the detection unit 1100 detects an imaging start operation. The imaging apparatus 1000 detects the user's imaging start operation, and the processing proceeds to step S1020. In step S1021, the acquisition unit 1200 obtains an image. In step S1022, the estimation unit 1300 estimates control information.

Suppose that a focus operation is performed at time t, and time $F_t$ is needed for focusing. In step S1023, the control unit 1400 stores the value of ft. In step S1023, the control unit 1400 performs imaging control. In step S1024, the detection unit 1100 detects the first operation for finalizing imaging or the second operation for interrupting imaging. In step S1025, the detection unit 1100 makes a determination based on the detection result of the user operation. If the user continues half-pressing the shutter button, the detection unit 1100 determines to continue imaging (YES in step S1025). The detection unit 1100 adds one to the imaging time so that $t \leftarrow t+1$, and the processing returns to S1021. If the user gives an imaging execution command, i.e., fully presses the shutter button or if the user gives an imaging interruption command, i.e., releases the finger from the shutter button (NO in step S1025), the processing proceeds to step S1030.

When the processing exits step S1020 and proceeds to step S1030, the reward or penalty $r_t$ to be used in Eqs. (3) and (4) for training is not a constant value but finely modified by $F_t$ as follows:

$$r_t = r_0 - \delta_t, \qquad (7)$$

where $\delta_t$ is a function defined by the foregoing $F_t$. For example, $\delta_t$ is set by the following:

$$\delta_t = \eta F_t \qquad (8)$$

Symbol $\eta$ is a parameter having a positive value. The present disclosure is not limited by the format of $\delta_t$. The reward or penalty at each time in step S1020 is thus changed based on the state of the imaging apparatus 1000 during step S1020, whereby training can be performed in consideration of responses to control operations at respective times. Through such processing, the imaging functions can be set more quickly.

Figure 8:
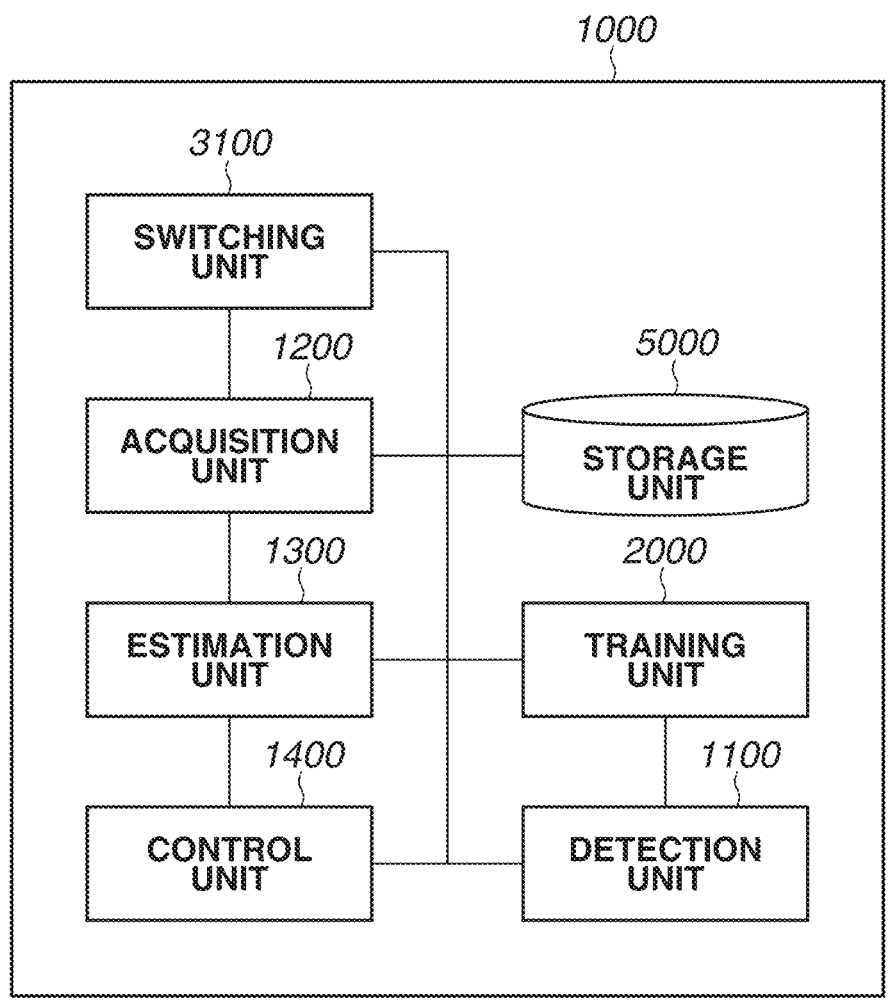
FIG. 8 is a block diagram illustrating a functional configuration example of the imaging apparatus.

In step S1010 of FIG. 4A, the storage unit 5000 may store a plurality of parameters of the trained model of the estimation unit 1300. Specifically, the estimation unit 1300 estimates control information by using different parameters (connection weights) of the trained model corresponding to respective imaging modes. For example, as illustrated in FIG. 8, the imaging apparatus 1000 includes a switching unit 3100 that switches the imaging modes. The switching unit 3100 selects an imaging mode according to an object the user wants to take a picture of.

Figure 17:
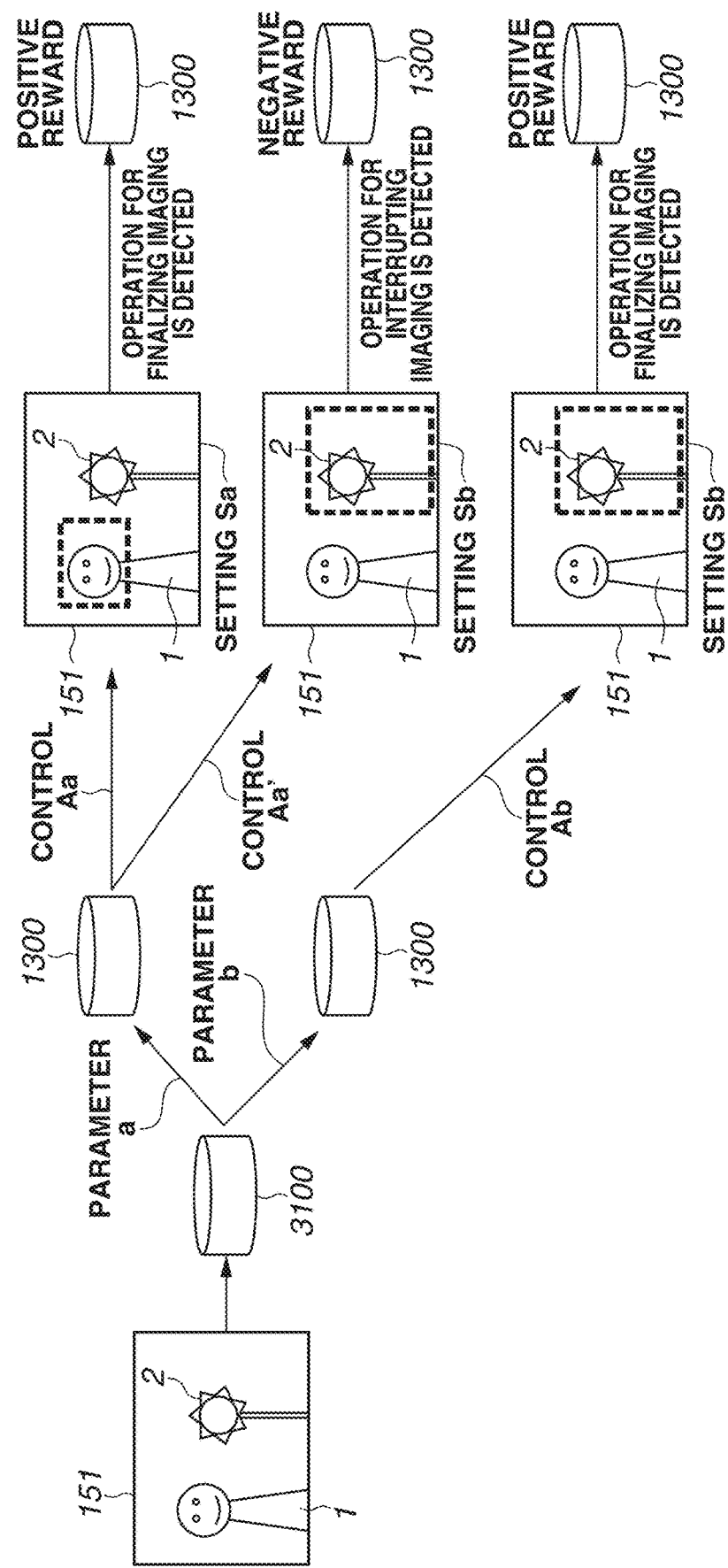
FIG. 17 is a diagram illustrating imaging modes.

Referring now to FIG. 17, an example of capturing an image of a human object and a flower will be described. An image 151 includes a person 1 and a plant 2. The user who wants to take a picture of the person 1 more sharply selects a "portrait mode" and performs imaging. Here, the imaging apparatus 1000 estimates control information suitable to capture an image of a person by using parameter a of the trained model corresponding to the "portrait mode". In the portrait mode, the user is likely to interrupt imaging if an object other than a human object comes into focus. The training is then performed to suppress the probability of selecting control Aa' to apply setting Sb. In contrast, the user who wants to take a picture of the flower 2 selects a "landscape mode", for example. In such a case, the imaging apparatus 1000 can estimate control information suitable to capture an image of a flower by using parameter b of the trained model corresponding to the "landscape mode". Since the parameters of the trained model are updated depending on the intended uses, training can be performed more quickly. Using a plurality of parameters of the trained models enables fine settings tailored to the user and the intended uses, compared to when control information is estimated by using a single trained model. A description will be provided with reference to the block diagram of FIG. 8 illustrating a functional configuration example. The storage unit 5000 stores K types of parameters Θk (k=1, . . . , K) related to the estimation unit 1300. The parameters Θk correspond to imaging modes, such as a night scene imaging mode, a sport imaging mode, and a snapshot imaging mode. The switching unit 3100 switches the imaging modes based on the user's operations or a result of recognition by an image classifier to which an image obtained by the acquisition unit 1200 is input. A method for switching the imaging modes based on the user's input operations will be described here. The user selects an imaging mode by using a mode selection function of the imaging apparatus 1000 before starting imaging (i.e., before half-pressing the shutter button). The switching unit 3100 switches the imaging modes based on the selected imaging mode. The selected imaging mode will be denoted by k. In step S1010, the acquisition unit 1200 obtains the parameter Θk of the trained model corresponding to the selected imaging mode k from the storage unit 5000. After the end of step S1020, the training unit 2000, in step S1030, updates the parameter Θk of the trained model. The updated parameter Θk of the trained model is stored into the storage unit 5000. The value of Θk stored in the storage unit 5000 is thereby updated. In such a manner, the parameters corresponding to the respective imaging modes based on images are trained separately. Imaging settings can thus be quickly made based on the imaging modes.

Figure 9:
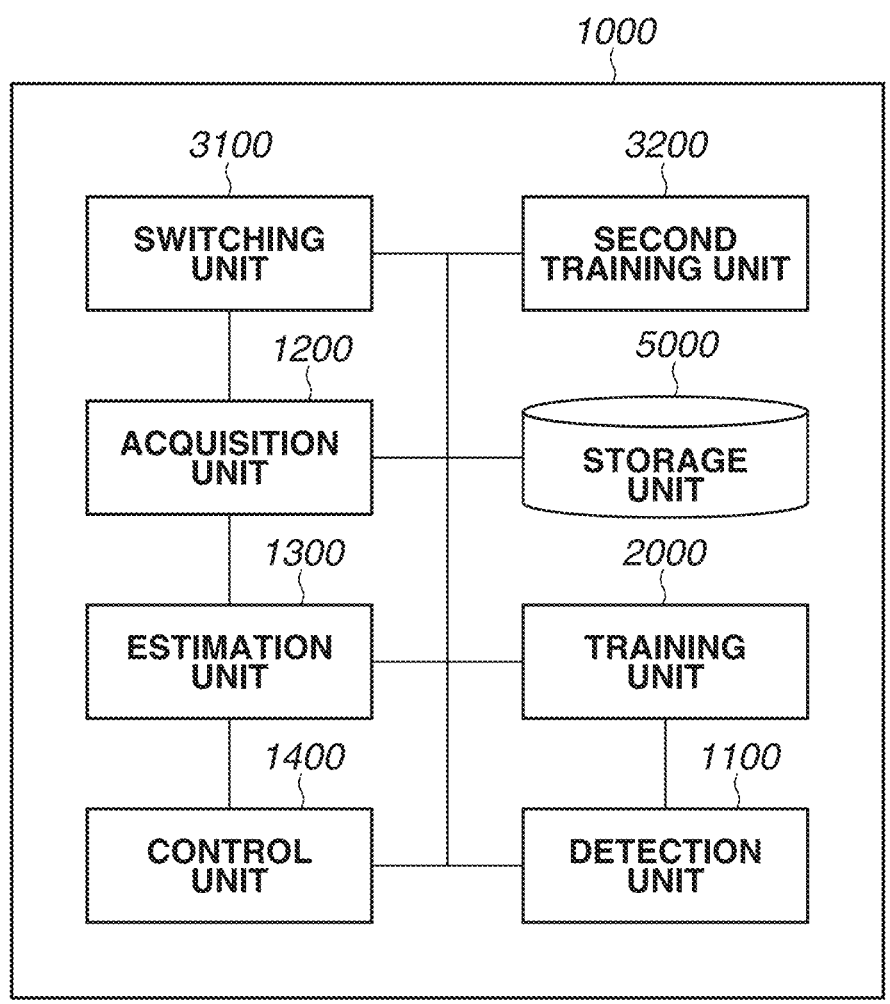
FIG. 9 is a block diagram illustrating a functional configuration example of the imaging apparatus.

The imaging apparatus 1000 may learn scene recognition processing for switching the imaging modes simultaneously with imaging. FIG. 9 is a block diagram illustrating a functional configuration example of the imaging apparatus 1000. The imaging apparatus 1000 further includes the switching unit 3100 and a second training unit 3200 in addition to the functional configuration of FIG. 3. The second training unit 3200 trains an image classifier for switching the imaging modes, included in the switching unit 3100. The switching unit 3100 switches the imaging modes based on a result of scene recognition performed by a scene classifier based on an image obtained by the acquisition unit 1200. FIGS. 10A and 10B are flowcharts illustrating processing performed by the imaging apparatus 1000. In step S10010 of FIG. 10A, the switching unit 3100 selects an image to be recognized by the image classifier. The processing proceeds to step S10020. In step S10021, the acquisition unit 1200 obtains an image. The acquisition unit 1200 also obtain the parameter Θk of the trained model corresponding to the selected imaging mode k from the storage unit 5000. In step S10031, the second training unit 3200 updates the parameters of a second trained model included in the image classifier by using a supervised learning method with the imaging mode k selected for the image as correct training data. The second trained model of the image classifier includes a neural network-based network structure for estimating an imaging mode corresponding to an input image, and parameters thereof. The parameters of the second trained model are updated by using the image and training data including the imaging mode corresponding to the image as a correct answer. Updating the parameters of the second trained model refers to processing for setting an image into the input layer of the second trained model, setting the right answer (here, imaging mode) to the image into the output layer, and then adjusting the parameters of the network so that the output calculated through the network approaches the set correct answer. An example of the training data for the second trained model is an image obtained by applying an imaging mode selected by the user in the past to the input image as a correct answer. Instead of a CNN, the image classifier may extract a feature amount, such as a scale-invariant feature transform (SIFT) feature amount and a histogram of oriented gradients (HOG) feature amount from the image, and perform recognition by using a support vector machine (SVM). With imaging time information and user setting information obtained by the acquisition unit 1200 as input data, the second training unit 3200 updates the parameters of the second trained model by using the input data as a correct training value for the image obtained by the acquisition unit 1200. The parameters of the image classifier updated through the training are stored in the storage unit 5000. In such a manner, the image classifier of the switching unit 3100 and the estimation unit 1300 for estimating control information are simultaneously trained along with a control operation. As a result, different control operations are automatically selected depending on images while the control operations are trained to be closer to the intention of the user.

The functional configuration of the imaging apparatus 1000 is not limited to the foregoing. For example, the training unit 2000 for updating the trained model may be included in an external apparatus. The process in step S1030 may be performed by an external apparatus, such as a PC. In such a case, when image files are uploaded to the PC, the parameters of the estimation unit 1300 are transmitted to the PC as well. The PC performs the foregoing training processing, and updates the transmitted parameters. The parameters obtained as the result of training are transmitted to the imaging apparatus 1000. The estimation unit 1300 of the imaging apparatus 1000 is then updated with the received parameters. The training can be efficiently performed since a high-throughput external apparatus, such as a PC, performs the training processing.

Suppose, for example, that the user is a professional photographer or an intermediate or experienced amateur photographer. Having trouble fine-adjusting settings can result in missing a shot in sport photography or in capturing an image of a quickly moving object, such as an animal. Settings tailored to the preferences of such a user can be quickly made by using the imaging apparatus 1000 according to the present exemplary embodiment. In contrast, if the user is a novice camera user, who often makes mistakes, the imaging apparatus 1000 can learn unfavorable control information. In such a case, the training function may be suppressed through a user setting. The training intensity may be increased based on the number of pictures taken or the activation time of the camera. This enables training corresponding to the user's experience and familiarity. The camera may be trained in advance by a professional photographer before shipment. Novice users can immediately take beautiful pictures since appropriate control information can be set easily.

A second exemplary embodiment of the present disclosure will be described below. In the first exemplary embodiment, how to train the estimation unit 1300 is described to be determined based on user operations during imaging. The present exemplary embodiment deals with a case where training is performed based on the user's data operations after imaging. Suppose, for example, that an image of an object different from one intended during imaging happens to be captured. In such a case, the user makes operations to delete or process the image captured by mistake. In the present exemplary embodiment, operation information about the deletion or processing of the image is used to give the trained model a negative reward for the imaging control on the image afterward. By contrast, if an image is excellently captured, the user can immediately store the image or register the image as a favorite. Such operation information about storing of an image is used to give the trained model a positive reward for the imaging control performed on the stored image. Even if an image fails to be captured with an imaging control intended during imaging, the trained model for outputting imaging controls can be updated by using operation information after imaging. This enables training for suitable imaging controls for scenes.

FIGS. 11A and 11B illustrate block diagrams illustrating functional configuration examples of the imaging apparatus according to the present exemplary embodiment. An overview will initially be given. The block diagram of FIG. 11A illustrating a functional configuration example includes an evaluation acquisition unit 1600 and an image storage unit 5100 in addition to the functional configuration of FIG. 3. The evaluation acquisition unit 1600 obtains a third operation by which the user stores an image and a fourth operation by which the user deletes or modifies an image. The image storage unit 5100 stores a plurality of images captured in the past. The image storage unit 5100 and the evaluation acquisition unit 1600 may be included in the imaging apparatus 1000 or in an external apparatus, such as an image processing apparatus 3000. In FIG. 11B, the image processing apparatus 3000 includes the evaluation acquisition unit 1600 and the image storage unit 5100. The evaluation acquisition unit 1600 obtains the third operation for storing an image captured by the user via application software and the fourth operation for deleting or modifying the image. Such operations show how the user evaluates the image. For example, favorite images and highly evaluated images are stored, and not-highly evaluated images are deleted. The evaluation acquisition unit 1600 may obtain data operations performed by the user on the captured image via application software.

FIG. 12 illustrates a flowchart for describing processing performed by the imaging apparatus 1000. The processing performed by the imaging apparatus 1000 is outlined as follows: In step S1010, the detection unit 1100 detects an imaging start operation. The imaging apparatus 1000 detects the user's imaging start operation, and the processing proceeds to step S1020. As in FIGS. 4A and 4B according to the first exemplary embodiment, step S1020 includes steps S1021, S1022, S1023, S1024, and S1025. Steps S1021 to S1025 are repeated while the shutter button is half-pressed. In step S1021, the acquisition unit 1200 obtains an image. In step S1022, the estimation unit 1300 outputs control information based on the trained model. In step S1023, the control unit 1400 performs imaging control. In step S1024, the detection unit 1100 detects a user operation. In step S1025, the detection unit 1100 makes a determination based on the detection result of the user operation. If the user continues half-pressing the shutter button, the detection unit 1100 determines to continue imaging (YES in step S1025). The detection unit 1100 adds 1 to the imaging time so that t←t+1, and the processing returns to step S1021. If the user gives an imaging execution command, i.e., fully presses the shutter button or if the user gives an imaging interruption command, i.e., releases the finger from the shutter button (NO in step S1025), the processing proceeds to step S12021. If imaging is executed, the acquisition unit 1200 obtains the captured image and the imaging control performed before the capturing of the image, and inputs the image and the imaging control into the image storage unit 5100. In step S12021, the image storage unit 5100 determines where there is an image yet to be learned. If there is no image yet to be learned (NO in step S12021), the processing ends. If there is an image yet to be learned (YES in step S12021), the processing proceeds to step S12022. In step S12022, the evaluation acquisition unit 1600 obtains the third operation for storing the image or the fourth operation for deleting or modifying the image. Alternatively, the evaluation acquisition unit 1600 may detect an operation for highly evaluating the image or an operation for lowly evaluating the image. In step S12030, the training unit 2000 performs reinforcement learning by using a reward based on the detected operation. More specifically, if the third operation is detected by the detection unit 1100, the training unit 2000 determines a positive reward. If the fourth operation is detected by the detection unit 1100, the training unit 2000 determines a negative reward. The training unit 2000 trains the trained model by using such rewards. Differences from the first exemplary embodiment will hereinafter be described in detail.

In step S12021, the image storage unit 5100 determines whether imaging is executed in step S1020. If imaging is executed in step S1020, the image storage unit 5100 stores the image. If there remains no image (i.e., imaging is not executed) (NO in step S12021), the processing ends. If there remains an image (YES in step S12021), the processing proceeds to step S12022. The imaging time information about each frame obtained, user setting information, and the corresponding imaging control information are stored in a predetermined memory.

In step S12022, the evaluation acquisition unit 1600 obtains the third operation for storing the image or the fourth operation for deleting or modifying the image. The third operation may be an operation for registering the image as a favorite or storing the image into a specific folder, aside from an instruction to store the image. The fourth operation may be an operation for storing the image into a trash folder, aside from an instruction to delete or modify the image. The trained model can be efficiently updated by learning such evaluations of images by the user as information.

Figure 13A:
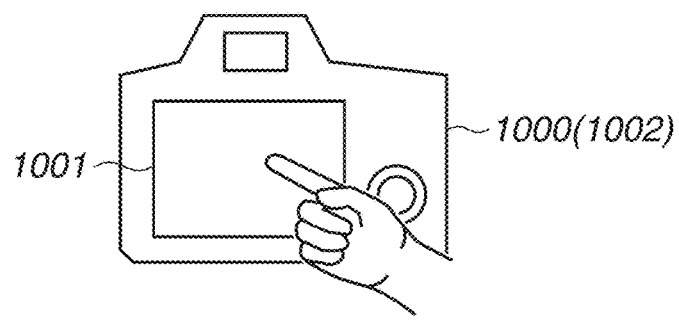
FIGS. 13A, 13B, and 13C are diagrams illustrating operations made by a user.
Figure 13B:
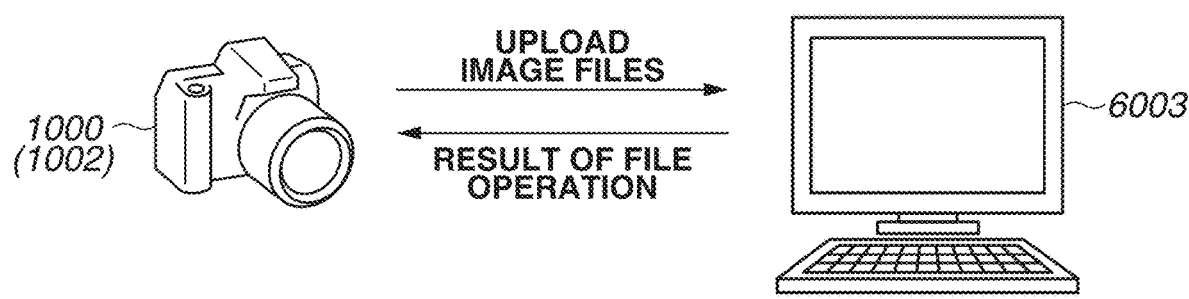

FIG. 13B illustrates an example where operations are performed outside the imaging apparatus 1000. Various apparatuses, including a PC, a tablet, a mobile phone, and a smartphone, can be used as the apparatus outside the imaging apparatus 1000. Here, a case of using a PC will be described as an example. The imaging apparatus 1000 uploads an image file to a PC 6003 in a wireless or wired manner. The PC 6003 includes an image storage unit 5100 and an evaluation acquisition unit 1600. The PC 6003 activates a user operation application. The user performs a desired operation on the image file as in the operation performed on the foregoing imaging apparatus 1000. The evaluation acquisition unit 1600 detects the operation performed on the image file by the user. The evaluation acquisition unit 1600 transmits the detected operation to the imaging apparatus 1000 in a wireless or wired manner.

In step S12030, the training unit 2000 trains the trained model for the imaging control by using a reward determined based on the evaluation obtained by the evaluation acquisition unit 1600. The training related to the control operation is performed based on the data operation performed on the image by the user in step S12022. If the image is deleted as the data operation, the training unit 2000 trains the trained model with the value of r in the foregoing Eqs. (3) and (4) set to a negative value, such as r=−1. Alternatively, the training unit 2000 performs training with the value of r set to a positive value if the user gives an evaluation label "good" to the image, and performs training with the value of r set to a negative value if the user gives an evaluation label "bad".

A rating that the user gives to the image may be reflected on the reward r as an evaluation score. If the user gives a numerical evaluation score to the image, the training unit 2000 gives a value based on the evaluation score to the reward r for training. For example, suppose that the evaluation score is defined in five grades 1 to 5, where 1 represents "worst", 3 "average", and 5 "best". The value of the reward r for a given evaluation score R is defined, for example, by the following:

$$r = \frac{R-3}{2}. \qquad (9)$$

If an image is moved or copied to a predetermined folder or predetermined storage medium or its filename is changed, the image can be one needed for the user. In such a case, a modest reward, e.g., r=0.1 may be given.

The training unit 2000 reads the imaging time information, user setting information, and a history of imaging time control operations stored in a predetermined memory during training, and performs reinforcement learning based on the value of the reward r so that the imaging time information, the user setting information, and the imaging time control operations are learned in association with each other.

Different learning coefficients may be used for the training during imaging and the additional training after imaging. The value of the learning coefficient (coefficient α) is changed between the respective training processes. The training processes may have different degrees of importance. For example, if higher priority is given to the result of image file operations after imaging over the user operations during imaging, the learning coefficient according to the first exemplary embodiment may be set to 0.05 and the learning coefficient according to the present exemplary embodiment to 0.1.

In such a manner, if the user performs a desired data operation on the captured image, the trained model of the estimation unit 1300 is trained and updated with the control operation performed to obtain the image in the imaging step. The imaging apparatus 1000 according to the present exemplary embodiment can thus become able to provide control operations suitable to obtain an image closer to what the user wants.

The processing performed by the evaluation acquisition unit 1600 may be performed after image files are uploaded to, for example, a PC outside the imaging apparatus 1000. The user can perform various operations, including storing, deletion, and modification operations. For example, if the user performs operations on the imaging apparatus 1000 as illustrated in FIG. 13A, the user can check images and perform operations on a display screen 1001 of the imaging apparatus 1000. Examples of the processing may include keeping images that provide desired results and deleting images that do not. The user may evaluate the images by using evaluation labels, such as "good" and "bad", or in the form of numerical values, such as an evaluation score. Reflecting evaluations other than such user evaluations enables taking pictures of higher quality. Other operations may be made, including renaming an image file, moving or copying an image file to a predetermined folder, writing an image file to a predetermined storage medium, storing an image file at a predetermined memory address, and transferring an image file to album software or a cloud application. The operations may be performed by using a physical method such as a dial and a button, or by touch panel operations on the display screen 1001.

Figure 13C:
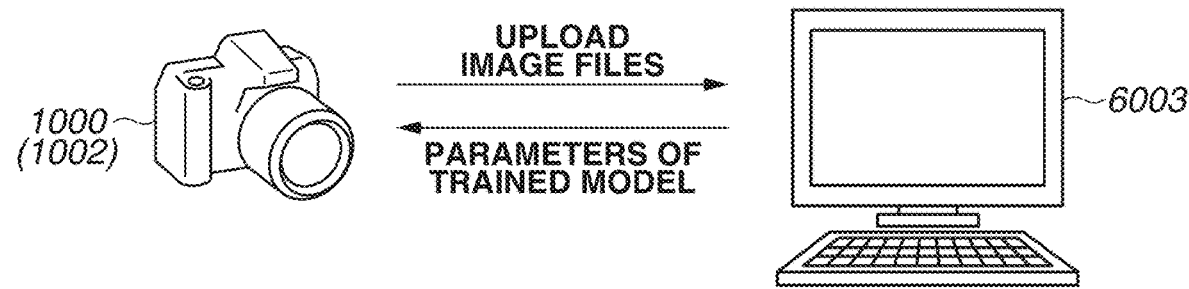

If step S12022 is performed by the PC 6003 outside the imaging apparatus 1000, step S1030 may be performed by the PC 6003 outside the imaging apparatus 1000 that has performed step S12022 as illustrated in FIG. 13C. In such a case, when uploading an image file to the PC 6003, the imaging apparatus 1000 also transmits the parameters of the trained model to the PC 6003. The PC 6003 performs the training processing and updates the transmitted parameters. The parameters obtained as the result of the training are transmitted to the imaging apparatus 1000. The estimation unit 1300 of the imaging apparatus 1000 is updated with the received parameters.

A third exemplary embodiment will be described below. The present exemplary embodiment deals with a case of performing training so that an object having a high frequency of appearance in the past captured images is likely to come into focus. Training is performed with the past captured images being checked and a reward being given if a frequently captured object is in focus. In contrast, if an image in which a frequently captured object appears blurred is obtained, a penalty is given for training. Repeating imaging thus provides control operations that facilitate focusing on a frequently captured object. Take, for example, the case of taking a family snapshot on a family trip. If the angle of view inevitably includes strangers, the imaging apparatus focuses on a family member by priority. Take the case of a school athletic meet. If the user attempts to take a picture of their child running from behind a crowd, a stranger's head in front or other children running beside can often come into focus. The present exemplary embodiment can avoid such situations.

Figure 14:
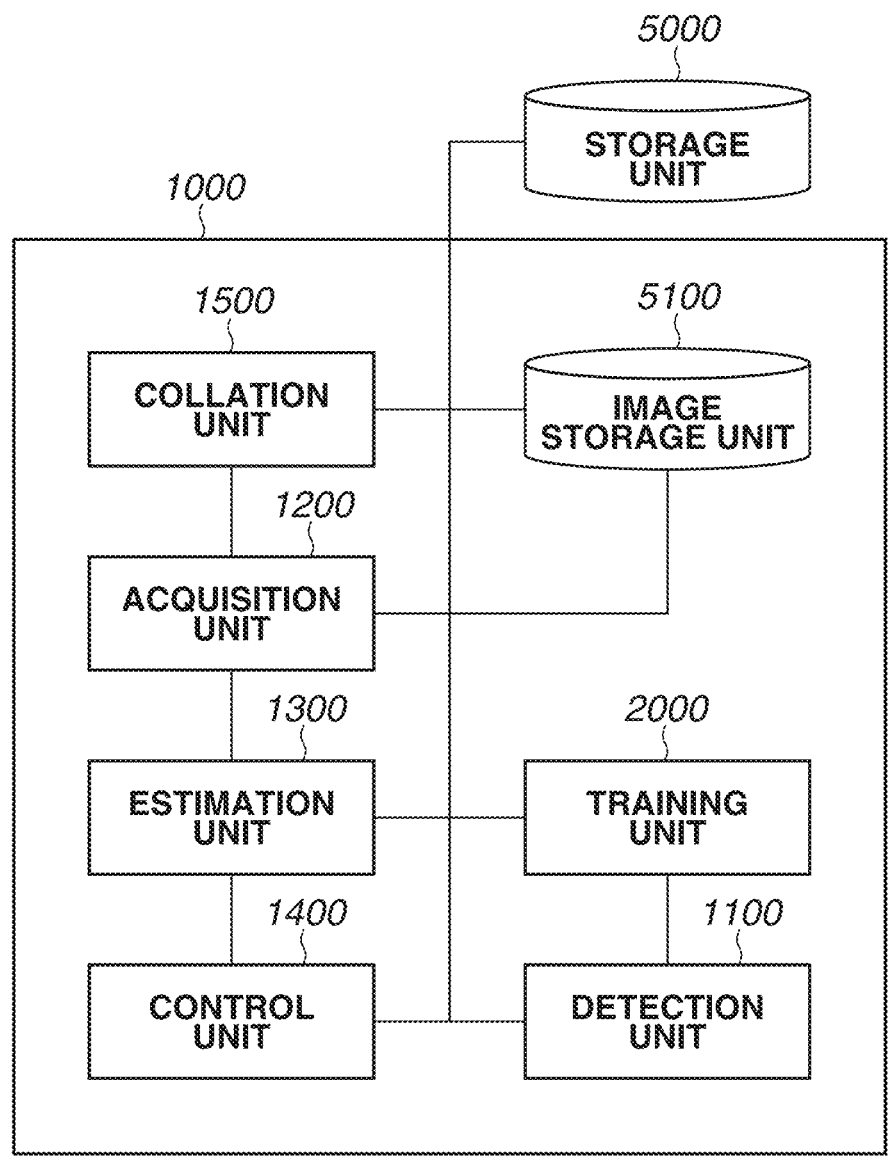
FIG. 14 is a block diagram illustrating a functional configuration example of an imaging apparatus.

A description will be given with reference to the block diagram of FIG. 14 illustrating a functional configuration example. An imaging apparatus 1000 according to the present exemplary embodiment includes a collation unit 1500 and an image storage unit 5100 in addition to the functional configuration of FIG. 3. The image storage unit 5100 stores a plurality of images captured in the past. The image storage unit 5100 is a storage inside the imaging apparatus 1000 or that of a PC outside the imaging apparatus 1000. The collation unit 1500 previously performs collation processing on the images stored in the image storage unit 5100, and assigns identifiers (IDs) to respective objects. For example, if the collation unit 1500 performs human collation processing, the same ID is assigned to the same person.

The collation unit 1500 of FIG. 14 counts the number of objects assigned respective IDs through the collation processing in the images stored in the image storage unit 5100. Suppose that the number of objects having ID=u is $N_u$. The frequency of appearance of the object having ID=u, $H_u$, is given by the following:

$$H_u = \frac{N_u}{N}, \qquad (10)$$

where N is the total number of images stored in the image storage unit 5100.

Figure 18:
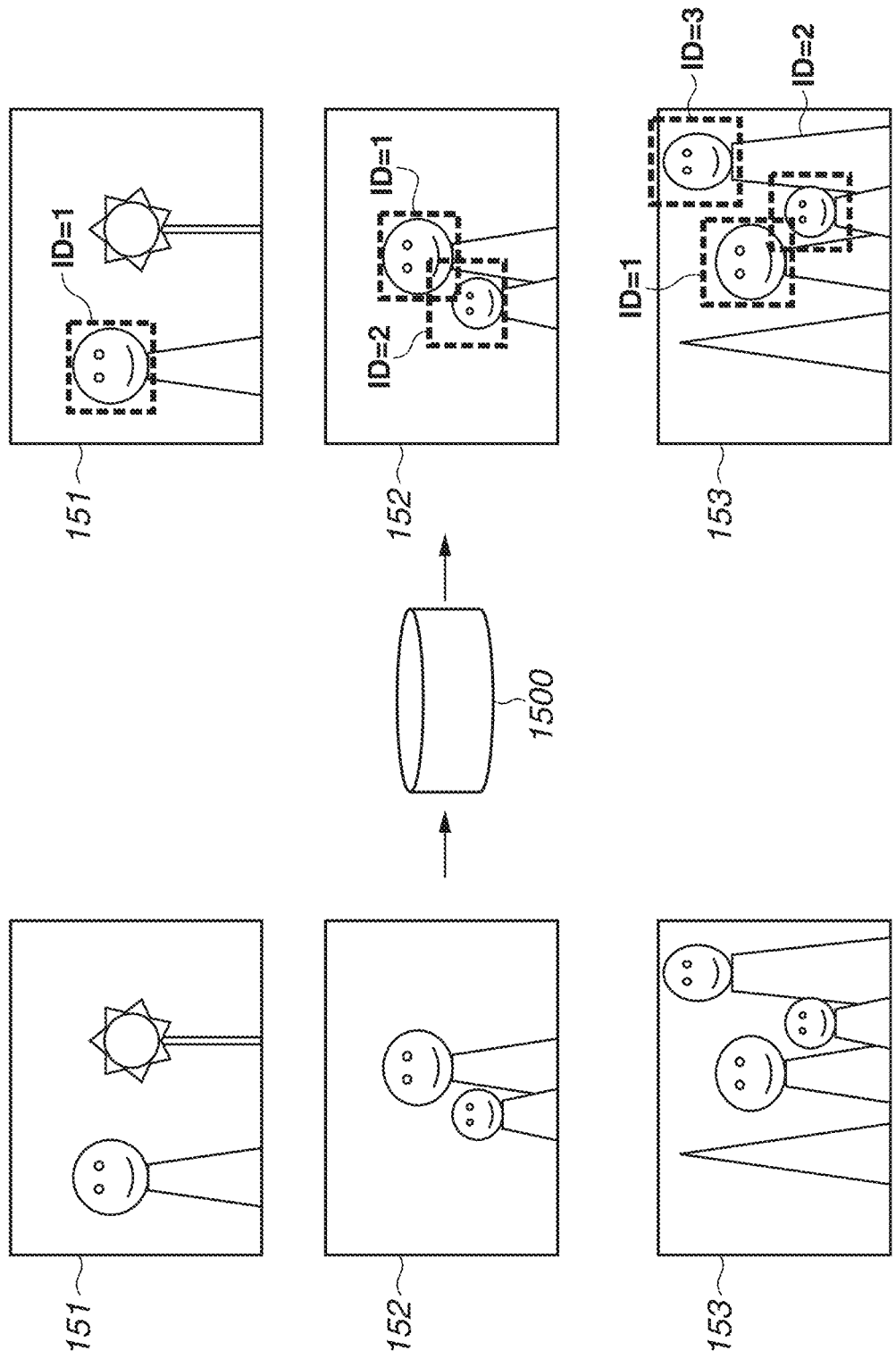
FIG. 18 is a diagram illustrating processing of a collation unit.

A specific example will be described with reference to FIGS. 18 and 19. In FIG. 18, an image 151, an image 152, and an image 153 are past captured images stored in the image storage unit 5100. The collation unit 1500 of the imaging apparatus 1000 collates image features of human faces in the images 151, 152, and 153, and assigns IDs to respective persons. For example, the person in the image 151 is assigned ID=1. The persons in the image 152 are assigned ID=1 and ID=2. The persons in the image 153 are assigned ID=1, ID=2, and ID=3. The imaging apparatus 1000 has captured the person of ID=1 most frequently.

Figure 19:
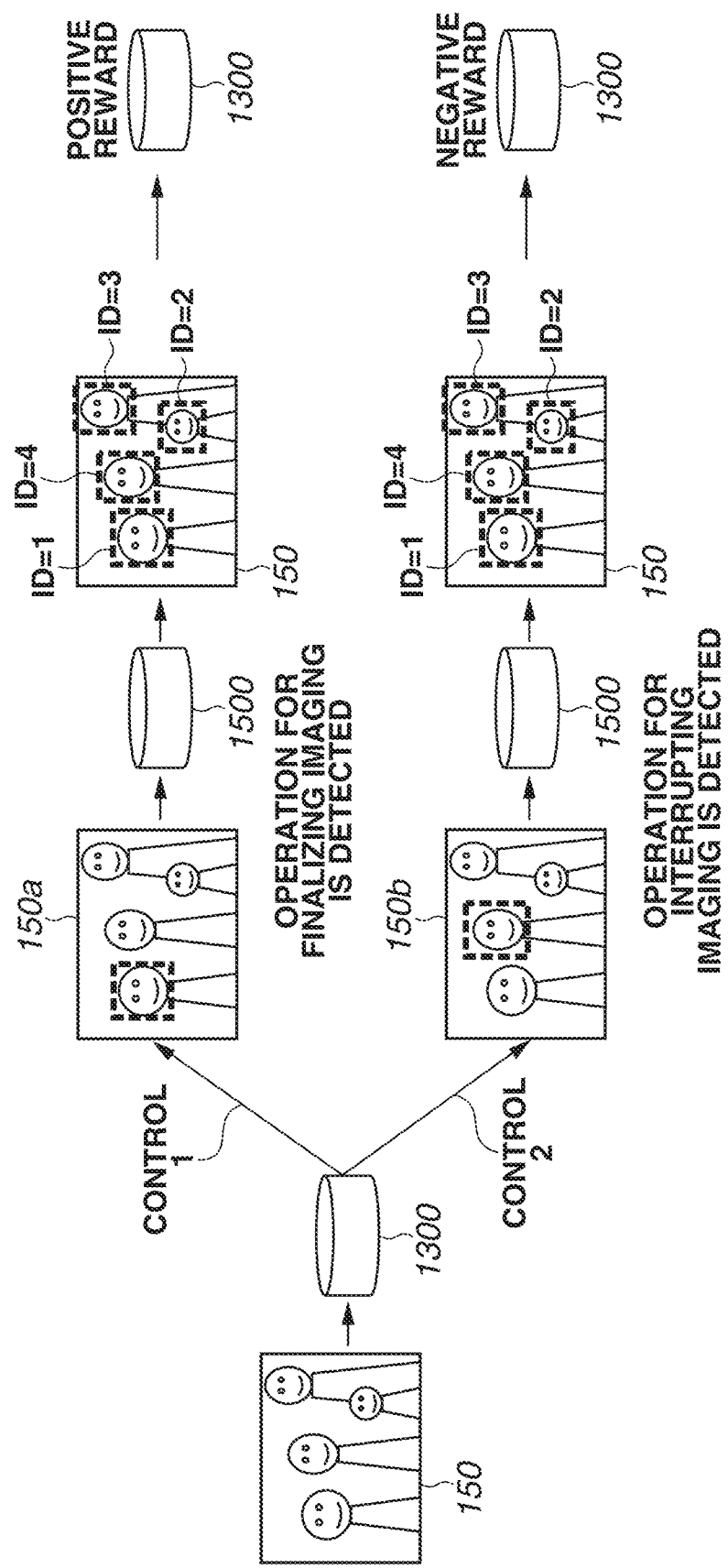
FIG. 19 is a diagram illustrating processing of a training unit.

Suppose in FIG. 19 that a new image 150 is captured. The image 150 includes persons of ID=2, ID=3, and ID=4 in addition to the person of ID=1. The estimation unit 1300 outputs a focus control for the image 150. The collation unit 1500 assigns the foregoing IDs to the respective persons. A highest positive reward is given if the focus control is directed at the person of ID=1 as in an image 150a. In contrast, a negative reward is given for training if the focus control is directed at the new person of ID=4 as in an image 150b.

Figure 15:
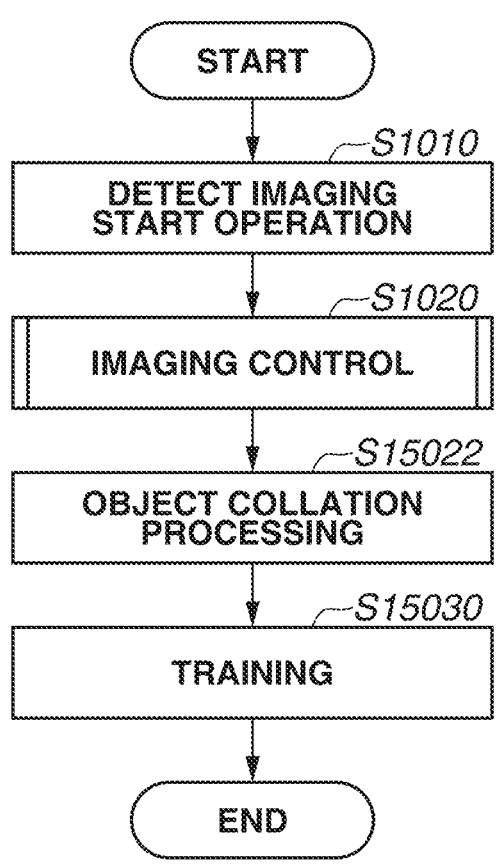
FIG. 15 is a flowchart illustrating a flow of processing performed by the imaging apparatus.

Next, a description will be provided with reference to the flowchart of FIG. 15 illustrating a flow of processing performed by the imaging apparatus 1000. Steps S1010 and S1020 are similar to those of the first exemplary embodiment, and thus will only be outlined. In step S1010, the detection unit 1100 detects an imaging start operation. The imaging apparatus 1000 detects the user's imaging start operation, and the processing proceeds to step S1020. Step S1020 is similar to that of FIG. 4B. In step S1021, the acquisition unit 1200 captures an image including an object or objects, and obtains imaging time information including the image and user setting information about the imaging apparatus 1000. In the present exemplary embodiment, the acquisition unit 1200 obtains the focus position of the focus function as a state. The focus position is expressed by a lens position and two-dimensional coordinates in the image. The focus position at a start of imaging will be referred to as a first focus position. In step S1022, the estimation unit 1300 estimates control information about the imaging functions in capturing an image of the object(s) from the imaging time information and the user setting information obtained by the acquisition unit 1200 based on the trained model. In step S1023, the control unit 1400 controls the imaging apparatus 1000 based on the control information about the imaging functions, output from the estimation unit 1300. Here, the control unit 1400 performs control to focus on an object. If the image includes no object, the control unit 1400 sets the center of the image as a default focus position. In step S1024, the detection unit 1100 detects the user's operation. As in the first exemplary embodiment, the detection unit 1100 of the present exemplary embodiment detects the user's imaging operation. In step S1025, the detection unit 1100 makes the following determination based on the user operation. If the user continues half-pressing the shutter button, the detection unit 1100 determines to continue imaging (YES in step S1025). The detection unit 1100 adds 1 to the imaging time t so that t←t+1, and the processing proceeds to step S1021. If an imaging execution command, i.e., an operation for fully pressing the shutter button is detected or if an imaging interruption command, i.e., an operation for releasing the finger from the shutter button is detected (NO in step S1025), the processing proceeds to step S15022.

Return to FIG. 15. In step S15022, the collation unit 1500 collates the image features of specific objects in the images (object images) obtained in the past with image features in the obtained image. In other words, the collation unit 1500 performs object collation processing on the image obtained from the last frame at the end of step S1020. Details of the object collation processing will be described below. The collation unit 1500 checks whether the object(s) in the image matches/match the ID-assigned objects in the images stored in the image storage unit 5100 in the past.

In step S15030, the training unit 2000 updates the parameters of the trained model by determining a positive reward if an ID-assigned object is detected to be in focus in the image obtained by the acquisition unit 1200, and a negative reward if no ID-assigned object is detected to be in focus. In other words, the training unit 2000 updates the trained model by determining a positive reward for the control information if the image features of an ID-assigned object match those of the object in focus in the new captured image, and determining a negative reward if the image features of none of the ID-assigned objects match those of the object in focus in the new captured image. That is, the training unit 2000 performs training about the control of the imaging apparatus 1000 based on the result of the collation processing performed in step S15022.

Steps S15022 and S15030 will be described in detail. Suppose that an image captured before includes M ID-assigned objects. The objects have an index m=1, ..., M, respectively. The ID assigned to object m is denoted by $ID_m$. The collation unit 1500 calculates contrast about the peripheral area of each object m and, as a result, obtains the following value $B_m$:

$$B_m = \begin{cases} 1 & \text{if the peripheral area of object } m \text{ is in focus} \\ -1 & \text{if the peripheral area of object } m \text{ is not in focus} \end{cases} \quad (11)$$

A value $r_m$ indicating the reward/penalty in step S15030 is given by the following:

$$r_m = B_m g(H_{ID_m}). \quad (12)$$

Here, g is a function determined by the frequency of appearance of the object serving as the argument. For example, g is given by the following equation:

$$g(H) = \begin{cases} 0 & \text{if } H < a \\ 1 & \text{if } H > b \\ \frac{H-a}{b-a} & \text{otherwise} \end{cases} \quad (13)$$

Here, the parameter a is a threshold by which to determine whether the object is excluded from the targets to be learned. For example, a=0.05. The parameter b is a minimum value, where the function g(H) has a value of 1. For example, b=0.3. While an example has been described above, the function g(H) may have various forms. The present disclosure is not limited to the definition of the function g(H). The control operations of the imaging apparatus 1000 are learned by updating the parameters of the trained model through training based on Eqs. (3) and (4) and based on the reward/penalty determined by Eq. (6). In such a manner, training is performed with the past captured images being checked and a reward being given if a frequently captured object is in focus. In contrast, if an image in which a frequently captured object appears blurred is obtained, a penalty is given for training. Repeating imaging thus provides control operations that facilitate focusing on a frequently captured object.

As in the first exemplary embodiment, step S15030 may be performed inside the imaging apparatus 1000 or by a PC or a server outside the imaging apparatus 1000. The training processing according to the present exemplary embodiment may be performed in combination with the first and second exemplary embodiments.

A fourth exemplary embodiment of the present disclosure will be described below. The present exemplary embodiment describes reinforcement learning in which rewards can be determined by users' operations from a plurality of terminals. This enables efficient collection of training data, so that training can be performed in a short time.

A functional configuration example of an information processing system according to the present exemplary embodiment will be described with reference to FIG. 20A. Specific details of the processing will be described below. An information processing system 10000 includes an imaging apparatus 1000 and an information processing apparatus 6000. The information processing system 10000 may include one imaging apparatus 1000, or simultaneously include a plurality of imaging apparatuses, such as imaging apparatuses 1000-1 to 1000-N illustrated in FIG. 26A.

The imaging apparatus 1000 illustrated in FIG. 20A includes a detection unit 1100, an acquisition unit 1200, an estimation unit 1300, a control unit 1400, a first storage unit 1501, a first training unit 2001, a first transmission unit 1700, and a first reception unit 1800. The first transmission unit 1700 and the first reception unit 1800 may be integrated into a communication unit. One of the most typical examples of the imaging apparatus 1000 is a digital camera. Other examples include a camera implemented on a mobile phone or smartphone, and a camera built in a tablet or notebook PC.

Figure 21A:
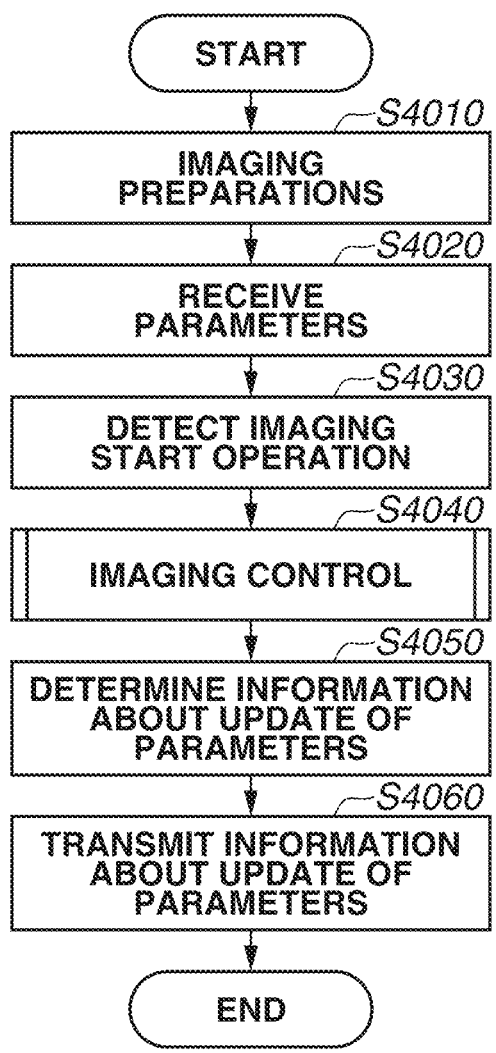
FIGS. 21A and 21B are flowcharts illustrating a flow of processing performed by an imaging apparatus.
Figure 21B:
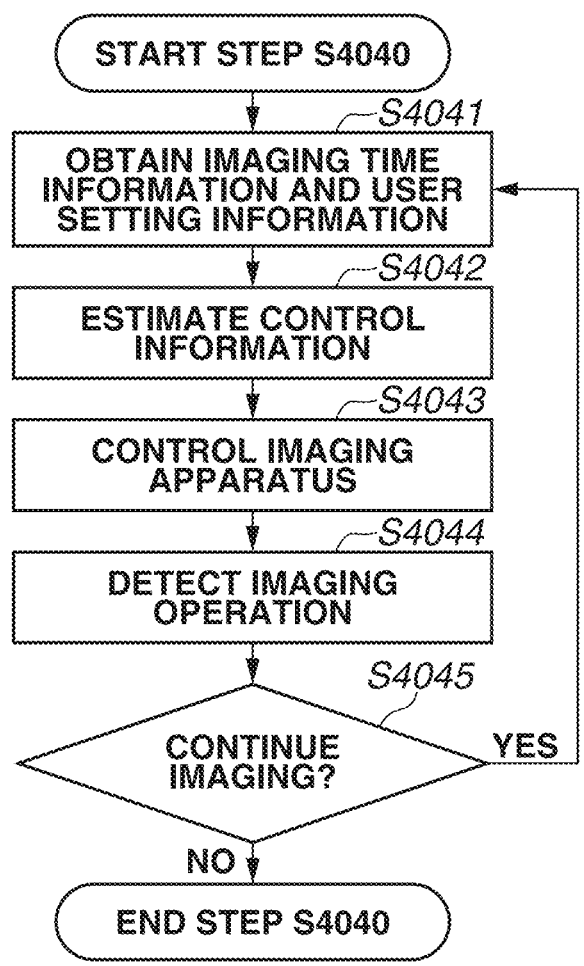

A flow of processing performed by the imaging apparatus 1000 will be outlined with reference to FIG. 21A. The processing illustrated in FIGS. 21A and 21B is performed by the CPU 101 of FIG. 2, which is a computer, according to a computer program stored in the storage device 104. In step S4010, the imaging apparatus 1000 makes imaging preparations. In step S4020, the first reception unit 1800 receives the parameters of the trained model in the estimation unit 1300 from the information processing apparatus 6000. The first storage unit 1501 stores the received parameters. In step S4030, the detection unit 1100 detects an imaging operation (here, operation for half-pressing a shutter button) made by the user who is operating the imaging apparatus 1000 as an imaging start operation. Step S4040 of FIG. 21B includes process to be repeated while the imaging start operation (for example, half-pressing of the shutter button) is being performed on the imaging apparatus 1000. In step S4041, the acquisition unit 1200 captures an image of a scene including an object based on a command obtained from the detection unit 1100, and obtains imaging time information including the image of the scene and user setting information about the imaging apparatus 1000. The imaging time information and the user setting information will be described below. In step S4042, the estimation unit 1300 estimates control information for a situation where the acquisition unit 1200 captures an image of an object next time by using the trained model, based on the imaging time information and the user setting information obtained by the acquisition unit 1200. Detailed processing will be described below. In step S4043, the control unit 1400 controls the imaging apparatus 1000 based on the control information estimated by the estimation unit 1300. In step S4044, the detection unit 1100 detects an imaging operation about whether to execute imaging by the imaging apparatus 1000. Specific examples of the imaging operation here include an operation for pressing the shutter button to finalize imaging, and an operation for releasing the shutter button to interrupt imaging. In step S4045, the detection unit 1100 determines whether to continue imaging based on the imaging operation performed by the user. If the detection unit 1100 detects that the shutter button is in a half-pressed state, the detection unit 1100 determines to continue imaging (YES in step S4045) and the processing returns to step S4041. If the shutter button is fully pressed or released, the detection unit 1100 determines to finalize or interrupt imaging (NO in step S4045), and step S4040 ends. In step S4050, the first training unit 2001 determines information about update of the parameters of the trained model based on the result of detection in step S4044. In step S4060, the first transmission unit 1700 transmits the information about the update of the parameters to the information processing apparatus 6000.

The information processing apparatus 6000 illustrated in FIG. 20A includes a second transmission unit 6700, a second reception unit 6800, a second training unit 6100, and a second storage unit 6500. The second transmission unit 6700 and the second reception unit 6800 may be integrated into a second communication unit. The information processing apparatus 6000 is a computer installed as a server. Typical examples include a workstation and a PC. The second storage unit 6500 stores the parameters of the trained model in the estimation unit 1300 of the imaging apparatus 1000. The second transmission unit 6700 reads the parameters from the second storage unit 6500, and transmits the read parameters to the imaging apparatus 1000. The second reception unit 6800 receives parameter update values obtained by the first training unit 2001 of the imaging apparatus 1000, and transmits the received parameter update values to the second training unit 6100. The second training unit 6100 updates the values of parameters based on the values of the parameters stored in the second storage unit 6500 and the received parameter update values. The updated parameters are stored into the second storage unit 6500.

The communication between the imaging apparatus 1000 and the information processing apparatus 6000 is performed by the first transmission unit 1700, the first reception unit 1800, the second transmission unit 6700, and the second reception unit 6800. The communication between the two apparatuses may be performed in a wired or wireless manner. The communication between the two apparatuses is not limited to direct communication, and may be performed via a router or another server.

A flow of processing performed by the information processing system 10000 will be described in detail with reference to FIG. 22A. In step S4010, the imaging apparatus 1000 transmits a signal requesting the parameters of the trained model in the estimation unit 1300 to the information processing apparatus 6000 as an imaging preparation. The process in step S4010 is triggered by the detection unit 1100 detecting the user's operation for making imaging preparations. Here, the operation for making imaging preparations refers to an operation for powering on the imaging apparatus 1000. The first transmission unit 1700 transmits the signal requesting the parameters of the trained model in the estimation unit 1300 to the information processing apparatus 6000. Various operations may be performed as the operation for making imaging preparations. Examples include operations, such as powering on the imaging apparatus 1000 and turning on an imaging mode. Alternatively, as in an operation for starting imaging to be described below, the half-pressing of the shutter button may be defined as the operation for making imaging preparations. In such a case, step S4010 is performed when an imaging control to be described below is started.

In step S5001, the second reception unit 6800 of the information processing apparatus 6000 receives the signal requesting the parameters of the trained model from the imaging apparatus 1000. In step S5002, the second transmission unit 6700 transmits the parameters of the trained model in the estimation unit 1300, stored in the second storage unit 6500 of the information processing apparatus 6000 in advance, to the first reception unit 1800. In step S4020, the first reception unit 1800 of the imaging apparatus 1000 receives the parameters of the trained model in the estimation unit 1300 from the information processing apparatus 6000. Having received the parameters transmitted from the information processing apparatus 6000, the first reception unit 1800 sets the values of the received parameters to the trained model in the estimation unit 1300.

In step S4030, the detection unit 1100 detects the user's operation for starting imaging. An example of the operation for starting imaging is an operation for half-pressing the shutter button. If the operation for starting imaging is detected, the processing proceeds to step S4040.

In step S4040, the imaging apparatus 1000 initializes an imaging time to t=1. Step S4040 of FIG. 21B includes steps S4041, S4042, S4043, S4044, and S4045. Steps S4041 to S4045 are repeated while the shutter button is in a half-pressed state. In step S4041, the acquisition unit 1200 obtains imaging time information and user setting information related to a scene including an object. There can be various types of imaging time information and user setting information. One of the most typical types of imaging time information is the image of the object obtained from the image sensor. The acquisition unit 1200 can also handle various other types of information obtained from the imaging apparatus 1000. Examples thereof include depth information obtained from an image plane phase difference, a contrast map obtained by calculating the magnitude of contrast in local areas of the image area by area, and a lens focus position. A By value that is an absolute brightness value of the entire image can also be handled as imaging time information. Various recognition results obtained with image information as an input may be used as a type of imaging time information. For example, a detection result of a face or human body, a detection result of a specific object, such as an animal, a vehicle, and an aircraft, and a scene recognition result may be handled as imaging time information. The user setting information includes information about settings made by the user in starting imaging. Examples thereof include an imaging mode selected by the user (such as a macro mode, a night scene mode, and a sport mode), an exposure setting, and a white balance mode.

In step S4042, the estimation unit 1300 estimates control information for controlling the imaging apparatus 1000 based on the trained model with the obtained imaging time information and user setting information as inputs. There can be various types of control information. Examples thereof include control values of a focus operation, an exposure setting, and a gain adjustment value. The trained model in the estimation unit 1300 is not limited in particular as long as the imaging time information and the user setting information can be converted into control information. To be specific, a procedure for estimating control information by using a CNN will be described here.

In step S4044, the detection unit 1100 detects an imaging operation about whether to perform imaging by the imaging apparatus 1000. Specific examples of the imaging operation here include an operation for continuing half-pressing the shutter button, an operation for pressing the shutter button to finalize imaging (first operation), and an operation for releasing the shutter button to interrupt imaging (second operation).

In step S4045, the detection unit 1100 determines whether to continue imaging based on the state of the shutter button. If the shutter button is detected to be half-pressed by the user, the detection unit 1100 determines to continue imaging (YES in step S4045). The detection unit 1100 adds 1 to the imaging time so that t←t+1, and the processing returns to step S4041. If imaging is executed by the user, i.e., the detection unit 1100 detects that the shutter button is fully pressed, the detection unit 1100 determines to end imaging (NO in step S4045) and the processing proceeds to step S4050. If imaging is interrupted, i.e., the detection unit 1100 detect that the shutter button is released, the detection unit 1100 determines to end imaging (NO in step S4045) and the processing proceeds to step S4050.

In step S4050, the first training unit 2001 determines, by using reinforcement learning, a positive reward if the first operation for finalizing imaging is detected, and a negative reward if the second operation for interrupting imaging is detected. If an imaging execution command is issued by the user in step S4044, the first training unit 2001 gives a "reward," regarding the imaging control so far as right. If an imaging interruption command is issued, the first training unit 2001 gives a "penalty," determining that the user determines that the imaging control so far is not appropriate. In such a manner, the first training unit 2001 performs reinforcement learning about the control operation performed during the imaging of the imaging apparatus 1000. Suppose that the time of the last frame at the end of imaging is $t_0$. For each of outputs at time $t=t_0, t_0-1, \ldots t \ldots, 1$ in step S4040, the map output section 2310 and the scalar/vector output section 2320 obtain respective action values Q as follows:

$$Q'_{i,k}(s_t,(x,y))=r_{t+1}+\gamma Q_{i,k}(s_{t+1},(x,y)), \text{ and} \tag{14}$$

$$Q'_{j,h}(s_t)=r_{t+1}+\gamma Q_{j,h}(s_{t+1}), \tag{15}$$

where (x, y) and k represent the position and operation of a control action $a_{t,i}$ selected for a control function i of the map output section 2310 at time t. The symbol h indicates the operation of the control action $a_{t,j}$ selected for a control function j of the scalar/vector output section 2320 at time t.

If a "positive reward" has been given by the user's operation detected in step S4044, $r_1$ has a positive value, such as 1. Fort other than 1, $r_t$ is uniformly 0. If a "negative reward" has been given for the imaging control, $r_1$ has a negative value, such as −1. For t other than 1, $r_t$ is uniformly 0. The symbol γ is a coefficient for temporally retrospectively attenuating the effect on each action. The symbol γ can be set to 0.9. If the resulting values of Q's are given as training values for the respective output layers, errors with respect to the functions i and j and the control actions k and h are expressed by the following equations:

$$L_{i,k}=(Q_{i,k}(s_t,(x,y))-Q'_{i,k}(s_t,(x,y)))^2, \text{ and} \tag{16}$$

$$L_{j,h}=(Q_{j,h}(s_t)-Q'_{j,h}(s_t))^2. \tag{17}$$

Based on such error functions, the entire CNN is trained by using a gradient descent method.

The first training unit 2001 may be included in the imaging apparatus 1000, or in a PC, portable terminal, or server outside the imaging apparatus 1000. If the first training unit 2001 is located outside the imaging apparatus 1000, the parameters of the trained model, the imaging time information, the user setting information, and information about the user operations obtained in the detection step are transmitted to the first training unit 2001 outside the imaging apparatus 1000 in a wireless or wired manner.

In step S4060, the first transmission unit 1700 transmits update-related information including a parameter change δΘ of the trained model to the information processing apparatus 6000.

In step S5003, the second reception unit 6800 receives the parameter change δΘ of the trained model transmitted from the first transmission unit 1700. The information processing apparatus 6000 may receive parameter changes δΘ of trained models from a plurality of imaging apparatuses.

In step S5004, the second training unit 6100 updates the parameters of the trained model based on the update-related information. Here, the second training unit 6100 obtains an updated parameter Θ' of the trained model by adding the received parameter change δΘ of the trained model to a parameter Θm of the trained model stored in the second storage unit 6500 as follows:

$$\Theta' = \Theta m + \delta\Theta. \tag{18}$$

The parameters of the trained model may be updated based on data obtained by the parameter changes δΘ of trained models received from a plurality of imaging apparatuses being combined. The updated parameter Θ' of the trained model is stored in the second storage unit 6500.

In such a manner, in one or more imaging apparatuses 1000-1 to 1000-N, either finalize imaging or interrupt imaging is selected. The parameters of the trained model stored in the information processing apparatuses 6000 are thereby trained and updated in a batch with control operations performed during imaging of the imaging apparatuses 1000-1 to 1000-N. By a plurality of imaging apparatuses repeating imaging, the imaging apparatus according to the present exemplary embodiment becomes able to provide control operations close to operations desired by various users.

(First Modification)

While the imaging apparatus 1000 is configured to perform training calculations inside, the training calculations may be performed by using an external terminal. For example, if an imaging apparatus is not powerful enough to perform the training processing, the imaging apparatus may transmit the data for training (the parameters of the trained model and the control information) to an information processing apparatus via an information terminal, such as a smartphone. FIG. 20B illustrates a configuration example of an information processing system 20000 in such a case.

The information processing system 20000 includes an imaging apparatus 1010, an information processing apparatus 6001, and a communication terminal apparatus 7000. The communication terminal apparatus 7000 is an apparatus including a program-based calculation function and a communication function. Specific examples include a smartphone, a tablet, and a notebook PC. Another camera having a calculation function may be used as the communication terminal apparatus 7000. The information processing system 20000 may include one imaging apparatus 1010 and one communication terminal apparatus 7000. As illustrated in FIG. 26B, a plurality of imaging apparatuses 1010 and a plurality of communication terminal apparatuses 7000 may be simultaneously included.

The imaging apparatus 1010 has a similar configuration to that of the imaging apparatus 1000 according to the fourth exemplary embodiment except that the first training unit 2001 and the first storage unit 1501 are not included. The information processing apparatus 6001 has a similar configuration to that of the information processing apparatus 6000 according to the fourth exemplary embodiment. Communication between the imaging apparatus 1010 and the information processing apparatus 6001 is relayed by using the communication terminal apparatus 7000. The first transmission unit 1700 of the imaging apparatus 1010 transmits imaging time information, user setting information, information about user operations, and a history of control information settings estimated by the estimation unit 1300 to the communication terminal apparatus 7000.

The communication terminal apparatus 7000 includes a third reception unit 7800, a third transmission unit 7700, a third training unit 7200, and a third storage unit 7100. If the third reception unit 7800 receives a signal requesting the parameters of the trained model from the first transmission unit 1700 of the imaging apparatus 1010, the communication terminal apparatus 7000 transmits the signal from the third transmission unit 7700 to the information processing apparatus 6001. The communication terminal apparatus 7000 also transmits the parameters of the trained model received from the information processing apparatus 6001 to the imaging apparatus 1010. The third reception unit 7800 receives the parameters of the trained model in the estimation unit 1300 from the information processing apparatus 6001. The third reception unit 7800 also receives the imaging time information, the user setting information, and the detection result of the detection unit 1100 from the imaging apparatus 1010. On the basis of such pieces of information, the third training unit 7200 determines values for updating the parameters of the trained model. The determined update values are transmitted from the third transmission unit 7700 to the information processing apparatus 6001.

The communication between the imaging apparatus 1010 and the communication terminal apparatus 7000 and the communication between the communication terminal apparatus 7000 and the information processing apparatus 6001 may be performed in a wired or wireless manner. The communication between the communication terminal apparatus 7000 and the information processing apparatus 6001 is not limited to direct communication, and may be performed via a router or another server.

Next, details of the processing in the foregoing configuration will be described with reference to the flowchart of FIG. 22B. In step S5010, the imaging apparatus 1010 transmits a signal requesting the parameters of the trained model in the estimation unit 1300 to the communication terminal apparatus 7000 as an imaging preparation. In step S5011, the third reception unit 7800 of the communication terminal apparatus 7000 receives the signal (request signal) requesting the parameters of the trained model from the imaging apparatus 1010. The second transmission unit 6700 further transmits data requesting the parameters of the trained model to the third reception unit 7800 of the information processing apparatus 7000. The second reception unit 6800 of the information processing apparatus 6001 receives the request signal relayed from the communication terminal apparatus 7000. In step S5012, the second transmission unit 6700 transmits the parameters of the trained model in the estimation unit 1300, stored in the second storage unit 6500, to the third reception unit 7800 of the communication terminal apparatus 7000. If the communication terminal apparatus 7000 receives the parameters from the information processing apparatus 6001, the third transmission unit 7700 simply transmits the received parameters to the imaging apparatus 1010, and stores a copy of the parameters into the third storage unit 7100.

In step S5013, the first reception unit 1800 of the imaging apparatus 1010 receives the parameters relayed from the communication terminal apparatus 7000. The parameters are set into the trained model of the estimation unit 1300. In step S4030, the detection unit 1100 detects the user's operation for starting imaging. An example of the operation for starting imaging is an operation for half-pressing the shutter button. If the operation for starting imaging is detected, the processing proceeds to step S4040.

In step S4040, as in FIG. 21B, the imaging apparatus 1010 estimates control information from an image and controls the imaging function. In step S5014, the first transmission unit 1700 transmits imaging time information, user setting information, information about user operations (user operation information), and a history of control information obtained in step S4040 to the communication terminal apparatus 7000 as training data. The training data is data for the communication terminal apparatus 7000 to determine the update values for the parameters of the trained model. The training data includes at least an image and the result of detection by the detection unit 1100.

In step S5015, the third reception unit 7800 of the communication terminal apparatus 7000 receives the imaging time information, the user setting information, the user operation information, and the history of control information. In step S5016, the third training unit 7200 determines information about the update of the parameters of the trained model in the estimation unit 1300 (parameter update values $\delta\Theta$). The third training unit 7200 performs training in a similar manner to that of the processing performed by the imaging apparatus 1000 in the fourth exemplary embodiment. In step S5017, the third transmission unit 7700 transmits the obtained information about the update of the parameters of the trained model to the information processing apparatus 6001. In step S5018, the second reception unit 6800 receives the information about the update of the parameters of the trained model.

Figure 22A:
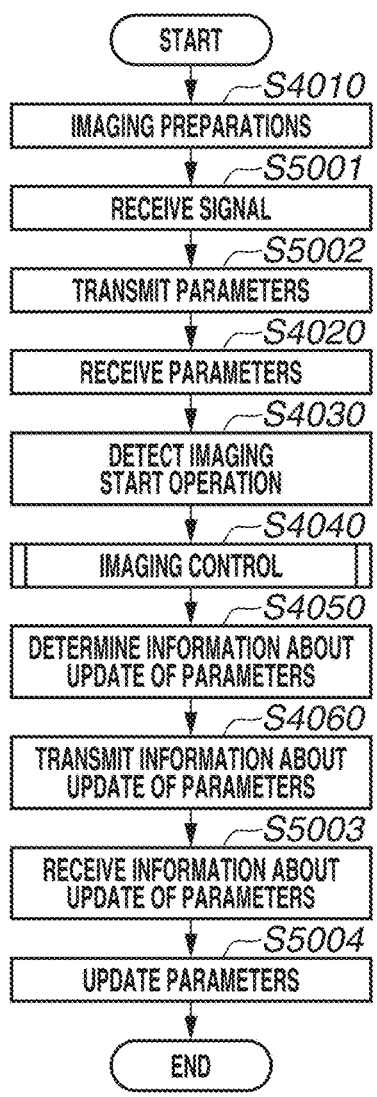
FIGS. 22A, 22B, and 22C are flowcharts illustrating a flow of processing performed by an information processing system.
Figure 22B:
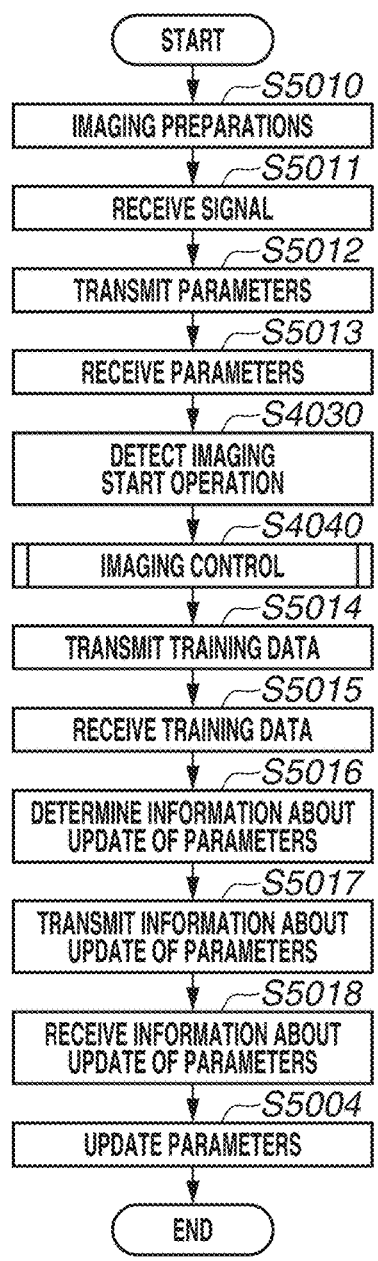

In step S5004, processing similar to that in FIG. 22A is performed, whereby the second training unit 6100 updates the parameters of the trained model in the estimation unit 1300. The updated parameters of the trained model are stored in the second storage unit 6500.

As described above, even if the imaging apparatus 1010 has only a weak calculation function, the processing for determining the update values of the parameters of the trained model can be efficiently performed by the communication terminal apparatus 7000 performing the calculation. Such a modification is effective if the speed of communication with the information processing apparatus 6001 is low or if the communication terminal apparatus 7000 has sufficient calculation speed. A user who performs training on an imaging apparatus and a user who performs training by using an imaging apparatus and a communication terminal apparatus in combination as in the present exemplary embodiment can simultaneously communicate with the information processing apparatus 6001. The communication terminal apparatus 7000 may only relay the training data without training, and the information processing apparatus 6001 may perform the determination of the update values and the update of the parameters.

(Second Modification)

Figure 20C:
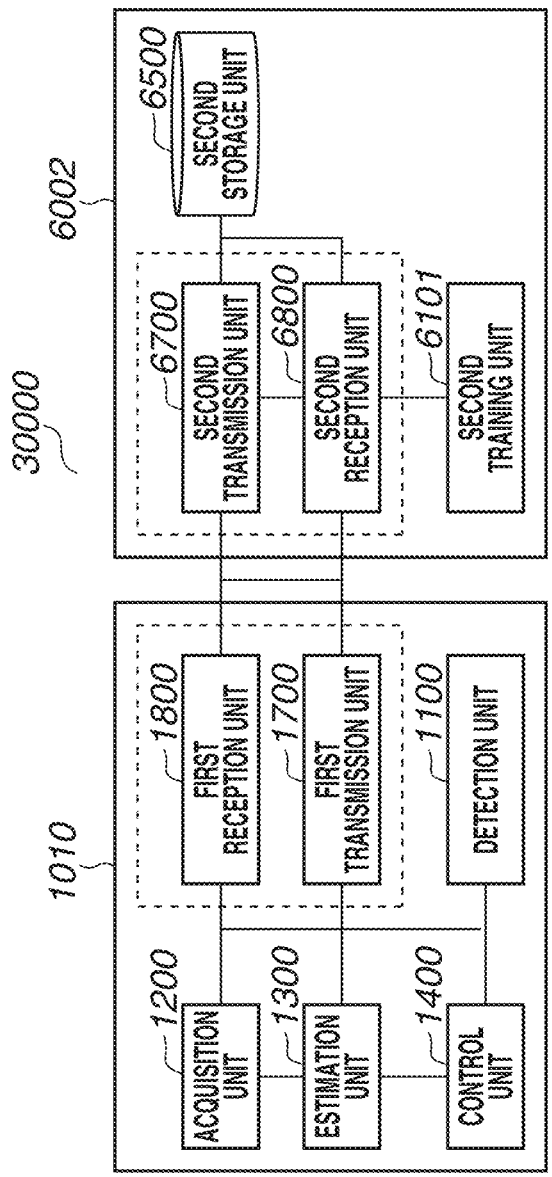

The processing for determining the update values of the parameters of the trained model has been described to be performed in an imaging apparatus or a communication terminal apparatus. However, the processing may be performed by an information processing apparatus. A description will be given with reference to a functional configuration example illustrate in FIG. 20C. An information processing system 30000 includes an imaging apparatus 1010 and an information processing apparatus 6002. In FIG. 20C, as in the fourth exemplary embodiment, the imaging apparatus 1010 and the information processing apparatus 6002 are illustrated to communicate with each other. However, the imaging apparatus 1010 and the information processing apparatus 6002 may communicate via an intermediary communication terminal apparatus as in FIG. 20B.

Figure 22C:
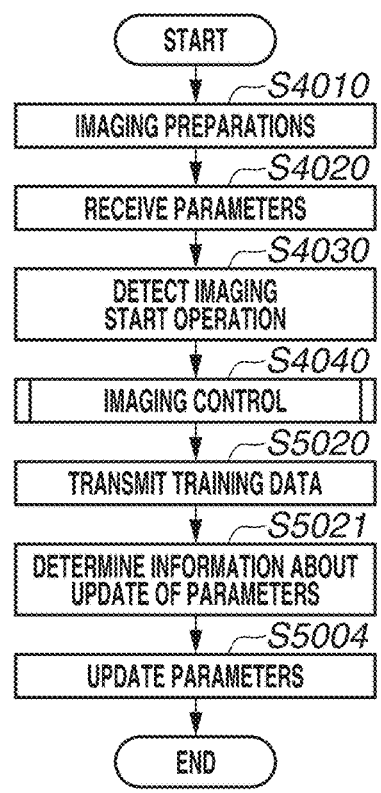

The imaging apparatus 1010 has a similar functional configuration to that of FIG. 20B. The information processing apparatus 6002 includes a second training unit 6101 in addition to a second transmission unit 6700, a second reception unit 6800, and a second storage unit 6500. The second training unit 6101 obtains information about update of the parameters of the trained model, and changes the parameters of the trained model based on the information about the update. Processing performed by the information processing system 30000 will be described with reference to FIG. 22C.

Steps S4010 to S4040 are processing performed by the imaging apparatus 1010. Steps S4010 to S4040 are similar to those of FIGS. 21A and 21B, and a description thereof will thus be omitted. In step S5020, the first transmission unit 1700 transmits imaging time information, user setting information, user operation information, and a history of control information settings to the information processing apparatus 6002. In step S5021, having received the imaging time information, the user setting information, the user operation information, and the history of control information settings, the second training unit 6101 determines information about update of the parameters of the trained model in the estimation unit 1300 as in the foregoing exemplary embodiment. In step S5004, the second training unit 6101 updates the parameters of the trained model. The parameters updated through training are written to the second storage unit 6500.

(Third Modification)

In step S4010 of FIG. 21A, the acquisition unit 1200 of the imaging apparatus 1000 may obtain situation information indicating the current situation in which the imaging apparatus 1000 is. For example, if position information is used as the current situation, the parameters of the trained model suitable for a tourist site can be provided so that tourists who visit the tourist site for the first time can immediately capture images with suitable settings. Since many people capture images at tourist sites, training data can be efficiently collected by using communication terminal apparatuses and information processing apparatuses. The parameters of the trained model tailored for a situation are selected based on information about the situation, such as a time and place where the imaging apparatus or the communication terminal apparatus is used. That is, optimum imaging controls for various situations can be immediately learned by preparing the parameters for the trained model situation by situation. Situation information, such as position information, time information, and weather information, is used as a reference for selecting the parameters of the trained model. Specific examples of the position information, time information, and weather information will be described.

Position information indicates where the imaging apparatus (or the user) is. Examples include Global Positioning System (GPS)-based latitude and longitude values. If the imaging apparatus includes a GPS, information about the current position of the imaging apparatus can be obtained. If the imaging apparatus communicates with the information processing apparatus via the communication terminal apparatus and the communication terminal apparatus includes a GPS, information from the GPS may be used. Position information may be input by the user. For example, the user may input the place name or address of the current position from the imaging apparatus or the communication terminal apparatus by using a keyboard or by voice. The user may select the place name or address by using application software. Such information may be captured by the imaging apparatus or by a camera function of the communication terminal apparatus, and read through character recognition.

A barcode or Quick Response (QR) code (registered trademark) corresponding to that place may be included in a guidebook, and the code may be captured to obtain position information. Since many users take pictures at a tourist site, for example, the use of such data can expedite training.

Time information indicates the time when the image is captured. The imaging apparatus may obtain the time information from a built-in clock. If the imaging apparatus communicates via the communication terminal apparatus, the imaging apparatus may obtain the time information from a clock built in the communication terminal apparatus. The information processing apparatus may estimate the time information by using the foregoing position information. A time or information, such as "day/night," may be input from the imaging apparatus or the communication terminal apparatus.

Weather information indicates the weather at a certain place. The weather information may be estimated from position information by using web information from the communication terminal apparatus 7000 or the information processing apparatus 6000. Alternatively, the user may input the weather condition into the imaging apparatus 1000 or the communication terminal apparatus 7000 via a user interface. The weather may be estimated based on various sensors (such as a temperature sensor and a humidity sensor) attached to the imaging apparatus 1000 or the communication terminal apparatus 7000.

Processing in the case of obtaining situation information will be described with reference to FIG. 22A. In step S4010, the acquisition unit 1200 of the imaging apparatus 1000 obtains situation information indicating the current situation in which the imaging apparatus 1000 is. The first transmission unit 1700 transmits the situation information to the information processing apparatus 6000 along with the signal requesting the parameters of the trained model in the estimation unit 1300. In step S5002, in response to the situation information being received along with the signal requesting the parameters of the trained model, the parameters of the trained model assigned to the situation information in advance is selected. For example, if the received situation information indicates nighttime, parameters for night are selected. The second transmission unit 6700 then transmits the parameters intended for the trained model in the estimation unit 1300. In step S4020, the first reception unit 1800 receives the parameters of the trained model. The first reception unit 1800 sets the parameters into the trained model in the estimation unit 1300. In such a manner, the parameters for the trained model are selected based on the situation information about the imaging apparatus 1000, whereby the parameters for the trained model in the imaging apparatus 1000 are trained based on the situation in which the imaging apparatus 1000 is. As a result, the imaging apparatus 1000 is appropriately controlled for various situations. For example, imaging control methods appropriate for specific tourist sites or corresponding to changes in situation, such as an evening scene and a night scene, can thus be provided with constant updates.

(Fourth Modification)

In step S4050 of FIG. 21A, the parameters of the trained model may be trained with respect to each imaging mode set by the imaging apparatus 1000. The estimation unit 1300 estimates control information by using different parameters (connection weights) for the trained model corresponding to the imaging modes. The parameters corresponding to the respective imaging modes are thereby separately trained based on images. The imaging settings based on the imaging modes can thus be quickly made.

In FIG. 20A, the second storage unit 6500 in the information processing apparatus 6000 stores K types of parameters Θk (k=1, . . . , K) of the trained model. The parameters correspond to respective imaging modes, such as a night scene imaging mode, a sport imaging mode, and a snapshot imaging mode.

A description will be provided with reference to FIG. 22A. In step S4010, the acquisition unit 1200 obtains the imaging mode selected by the user. Alternatively, the acquisition unit 1200 may automatically select an imaging mode by scene recognition. The information about the selected imaging mode is transmitted to the information processing apparatus 6000. Suppose that the selected imaging mode is k. In step S5001, the second reception unit 6800 receives the information about the imaging mode transmitted from the imaging apparatus 1000. In step S5002, the second transmission unit 6700 obtains the parameter Θk corresponding to the selected imaging mode k from the second storage unit 6500, and transmits the parameter Θk to the imaging apparatus 1000.

(Fifth Modification)

In step S4010, a scene classifier may be trained simultaneously with imaging. If the scene classifier is trained simultaneously with control operations, different control operations are automatically selected depending on the scene while the control operations themselves are trained to be closer to the user's intention. A description will be provided with reference to FIGS. 23A and 23B. In step S4010, an imaging mode is selected based on an input image by using the scene classifier. The information about the selected imaging mode is transmitted to the information processing apparatus 6000. The scene classifier is not limited to any particular technique as long as machine learning can be performed with the technique. For example, a CNN may be used. Feature amounts, such as SIFT and HOG feature amounts may be extracted from the image, and the scene may be recognized by using an SVM. In step S5001, the second reception unit 6800 receives the information about the imaging mode. In step S5002, the second transmission unit 6700 transmits the parameter Θk to the first reception unit 1800. In step S4020, the first reception unit 1800 receives the parameter Θk, and sets the parameter Θk into the estimation unit 1300. The process in step S4030 is similar to that in the fourth exemplary embodiment. In step S9040, the control unit 1400 performs imaging control based on the image currently being captured. Referring now to FIG. 23B, in step S4041, the acquisition unit 1200 acquires an image. In step S9042, a recognition unit (not illustrated) inputs the acquired image to the scene classifier, thus performing scene recognition. In step S4043, the control unit 1400 performs the image control. In step S4044, the detection unit 1100 detects an imaging operation. In step S4045, the detection unit 1100 determines whether to continue imaging. If the detection unit 1100 detects the state where the shutter button is half-pressed, the detection unit 1100 determines to continue imaging. If the detection unit 1100 detects the state where the finger is released from the shutter button, the detection unit 1100 determines to end imaging. A description thereof will thus be omitted. In step S4050, the first training unit 2001 obtains an update value δΘk of the parameter Θk. At the same time, the first training unit 2001 calculates a parameter update value δW for the scene classifier. The first training unit 2001 trains the scene classifier with the imaging time information and the user setting information obtained by the acquisition unit 1200 as training data and with the training data as a positive example of the currently selected scene. Suppose that the parameter of the scene classifier before training is W0 and the trained parameter is W'. Using a difference therebetween, the update value δW is expressed by the following:

$$\delta W = W' - W0. \quad (19)$$

In step S4060, the first transmission unit 1700 transmits the update values δΘk and δW to the information processing apparatus 6000. In the information processing apparatus 600, the second training unit 6100 updates the parameter Θk of the trained model and updates the parameter W of the scene classifier as well. The parameters of the estimation unit 1300 and the scene classifier updated by the training are stored in the second storage unit 6500.

(Sixth Modification)

To control the settings of the imaging functions more quickly, a reward in consideration of a needed time may be added based on the state of the imaging apparatus 1000 during step S4040 in FIG. 21B. Suppose that in step S4043 of FIG. 21B, a focus operation is performed at time t, and time $F_t$ is needed for focusing. The control unit 1400 stores the value of $F_t$. In step S4050 of FIG. 21A, the reward/penalty $r_t$ used in Eqs. (14) and (15) for training is not a constant value but finely modified by using $F_t$ by the following:

$$r_t = r_0 - \delta_t, \quad (20)$$

where $\delta_t$ is a function defined by the foregoing needed time $F_t$. The function $\delta_t$ is set by the following:

$$\delta_t = \eta F_t. \quad (21)$$

The symbol η is a parameter having a positive value. In such a manner, training can be performed in consideration of reactions to the control operations at respective times by changing the reward/penalty $r_t$ at each time during imaging control based on the state of the imaging apparatus 1000 during the imaging control.

A fifth exemplary embodiment of the present disclosure will be described below. In the fourth exemplary embodiment, how to train the estimation unit 1300 is described to be determined based on user operations during imaging. The present exemplary embodiment deals with a case where training is performed based on data operations after imaging. Specific examples of the data operations after imaging include operations for storing an image, registering an image as a favorite, evaluating an image (good or bad, or in terms of points), deleting an image, and processing an image. In the present exemplary embodiment, for example, operation information about the deletion of an image is used to give the trained model a negative reward for the imaging control on the image afterward. In contrast, if an image is excellently captured, the user can immediately store the image or register the image as a favorite. Such operation information about storing an image is used to give the trained model a positive reward for the imaging control on the stored image. Even if an image fails to be captured with the intended imaging control during imaging, the parameters of the trained model outputting the imaging control can be updated by using the operation information after the imaging. The parameters of the trained model for performing imaging control as intended by the user can thus be provided.

Figure 24:
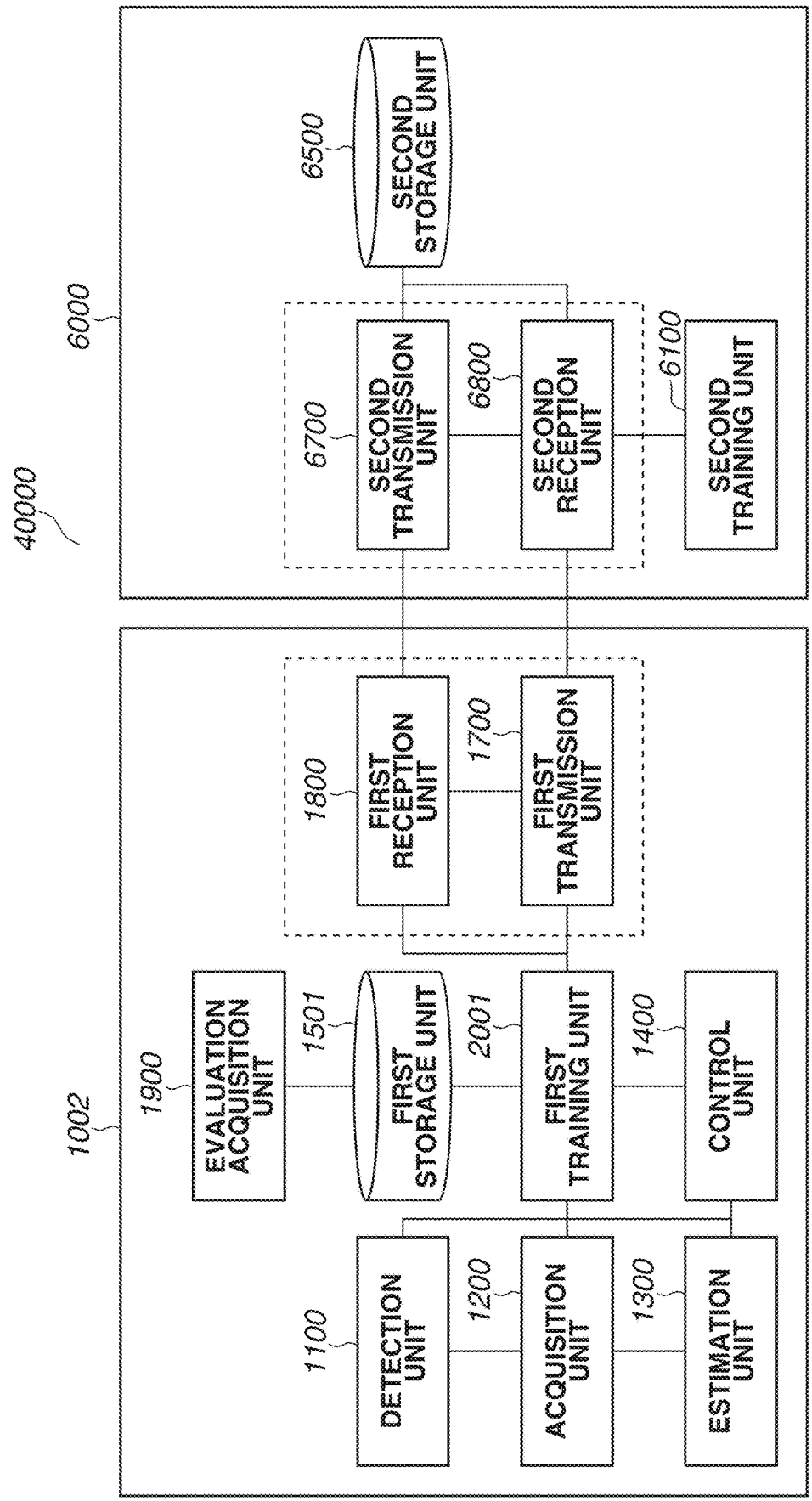
FIG. 24 is a block diagram illustrating a functional configuration example of an information processing system.
Figure 25A:
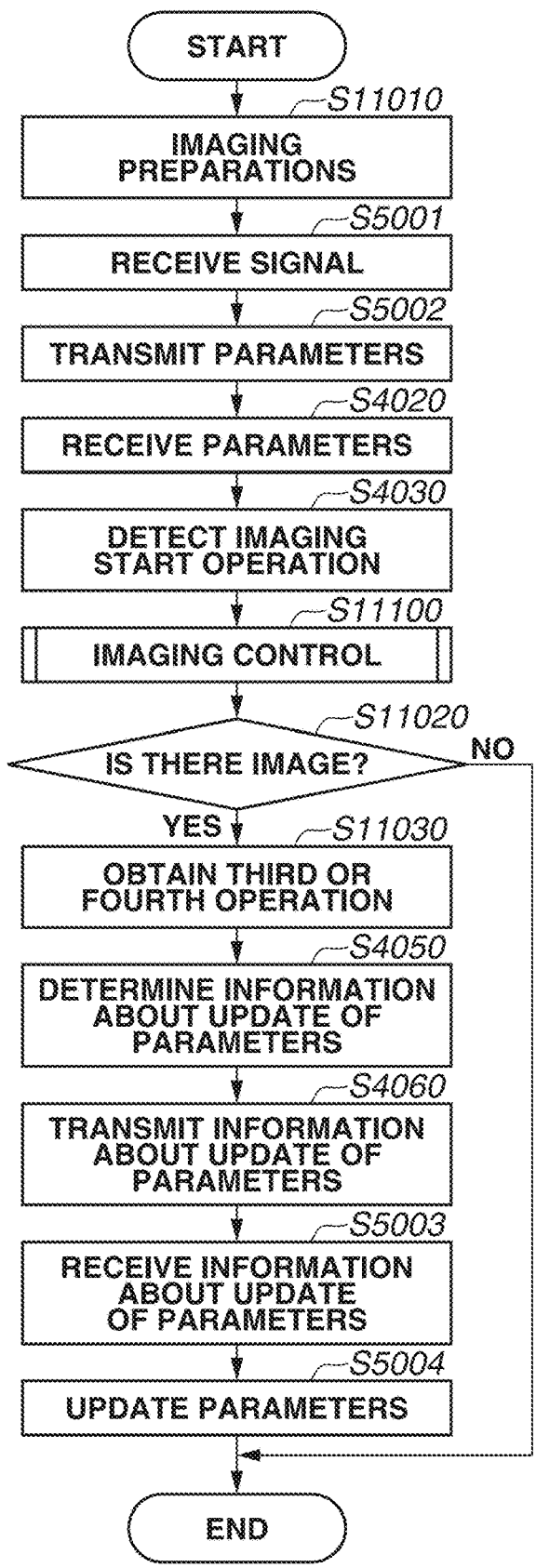
FIGS. 25A and 25B are flowcharts illustrating a flow of processing performed by the information processing system.

FIG. 24 illustrates a functional configuration example of an information processing system 40000 according to the present exemplary embodiment. The information processing system 40000 includes an imaging apparatus 1002 and an information processing apparatus 6000. The information processing apparatus 6000 has a similar functional configuration to that of FIG. 20A. A description thereof will thus be omitted. The imaging apparatus 1002 includes an evaluation acquisition unit 1900 in addition to the functional configuration of FIG. 20A. The evaluation acquisition unit 1900 accepts a third operation by which the user stores an image and a fourth operation by which the user deletes or modifies an image. The processing of the evaluation acquisition unit 1900 will be described in detail with reference to flowcharts to be described below. The information processing system 40000 may have a configuration as illustrated in FIG. 20B or 20C. Next, processing performed by the information processing system 40000 will be described with reference to FIGS. 25A and 25B. In step S11010, the detection unit 1100 detects the user's operation for making preparations for imaging. Here, the operation for making preparations for imaging refers to an operation for powering on the imaging apparatus 1002.

In step S11100, the imaging apparatus 1002 performs processing corresponding to step S4040 in FIG. 21B. In step S11101, the detection unit 1100 determines whether imaging is executed. If imaging is executed (the shutter button is detected to be fully pressed), the first storage unit 1501 stores the imaging time information about each frame obtained, the user setting information, and corresponding imaging control information into a predetermined memory. If there remains no image (i.e., imaging is interrupted), the processing ends. If there remains an image, the processing proceeds to step S11102.

In step S11102, the evaluation acquisition unit 1900 accepts a data operation on the image to obtain the third operation for storing the image or the fourth operation for deleting or modifying the image. The data operation indicates the user's favorable or unfavorable evaluation of the image. Specifically, the third operation may be an operation for registering the image as a favorite or an operation for storing the image into a specific folder, aside from an instruction to store the image. The fourth operation may be an operation for storing the image into a trash folder, aside from an instruction to delete or modify the image. The trained model can be efficiently updated by training being performed with such intuitive operations by the user as information.

Data operations on images may be made on the imaging apparatus 1002, or made after image files are uploaded to a PC outside the imaging apparatus 1002. If data operations are made on the imaging apparatus 1002, the images can be checked on a display screen 1001 of the imaging apparatus 1002 for data operations as illustrated in FIG. 13A. The user can make various data operations. Examples may include processing for keeping images that provide desired results and deleting images that do not. The user may evaluate the images by using evaluation labels, such as good and bad, or in the form of numerical values such as an evaluation score. Other operations may include renaming an image file, moving or copying an image file to a predetermined folder, writing an image file to a predetermined storage medium, storing an image file at a predetermined memory address, and transferring an image file to album software or a cloud application. The operations may be performed through a physical method, such as a dial and a button, or with touch panel operations on the display screen 1001.

FIG. 13B illustrates an example where operations are made outside the imaging apparatus 1002. Various apparatuses such as a PC, a tablet, a mobile phone, and a smartphone can be used as the apparatus outside the imaging apparatus 1002. Here, an example using a PC will be described. The imaging apparatus 1002 uploads image files to a PC 6003 in a wireless or wired manner. The PC 6003 activates a user operation application. The user performs desired data operations on the image files as in the case of the foregoing imaging apparatus 1002. The data operations performed on the image files by the user are transmitted to the imaging apparatus 1002 in a wireless or wired manner.

In step S11103, the first training unit 2001 determines the reward based on an evaluation obtained by the evaluation acquisition unit 1900. In step S11104, the first training unit 2001 performs training about the control operation performed to obtain the image, based on the data operation performed, in step S11102, on the image by the user. If the image is deleted by the data operation, the first training unit 2001 performs training by setting the value of r in the foregoing Eqs. (14) and (15) to a negative value like r=−1. Alternatively, the first training unit 2001 performs training by setting the value of r to a positive value if the user gives an evaluation label "good" to the image, and setting the value of r to a negative value if the user gives an evaluation label "bad". If the user gives a numerical evaluation score to the image, the first training unit 2001 gives a value based on the evaluation score to the reward r for training. Suppose, for example, the evaluation score is defined in five grades 1 to 5, where 1 represents "worst", 3 "intermediate", and 5 "best". In such a case, the value of a reward r for a given evaluation score R is defined by the following:

$$r = \frac{R-3}{2}. \tag{22}$$

If an image is moved or copied to a predetermined folder or a predetermined storage medium or its filename is changed, the image can be one needed for the user. In such a case, a modest reward, e.g., r=0.1 may be given. The learning coefficient of the training after imaging can be set to be lower than that of the training during imaging. This enables stable training.

The first training unit 2001 reads the imaging time information, the user setting information, and a history of imaging time control operations stored in a predetermined memory during training, and performs reinforcement learning based on the value of the reward r so that the imaging time information, the user setting information, and the imaging time control operations are learned in association with each other.

In step S4050, the first training unit 2001 obtains an update value δΘ (update-related information) from the values of the parameters of the trained model before and after training as in the fourth exemplary embodiment. In step S4060, the first transmission unit 1700 transmits the value of the obtained update value δΘ to the information processing apparatus 6000. In step S5003, the second reception unit 6800 receives the update value δΘ. In step S5004, the second training unit 6100 updates the parameters of the trained model based on the update-related information δΘ. The data operation in step S11102 may be performed on the PC 6003 outside the imaging apparatus 1002. FIG. 13C illustrates the configuration in such a case. When image files are uploaded to the PC 6003, the parameters of the trained model are also transmitted to the PC 6003. The PC 6003 performs the training processing and calculates a parameter update value δΘ. The calculated update value δΘ is transmitted to the information processing apparatus 6000.

The present exemplary embodiment may be carried out in combination with other exemplary embodiments. More specifically, after the training described in the first exemplary embodiment is performed by using information during imaging, additional training according to the present exemplary embodiment is performed based on user operations after imaging. The values of the learning coefficients of the respective training processes may be changed to provide a difference in the degree of importance between the respective training processes. For example, to give higher priority to the results of image file operations after imaging over user operations during imaging, the learning coefficient according to other exemplary embodiments may be set to 0.05 and the learning coefficient according to the present exemplary embodiment to 0.1.

(First Modification)

Rewards may be determined by reflecting feedbacks from various users. For example, images captured by an imaging apparatus are uploaded to a web server, and viewed and shared by a plurality of users for image evaluation. A method for training the parameters of the trained model based on such feedback results will be described.

Figure 26A:
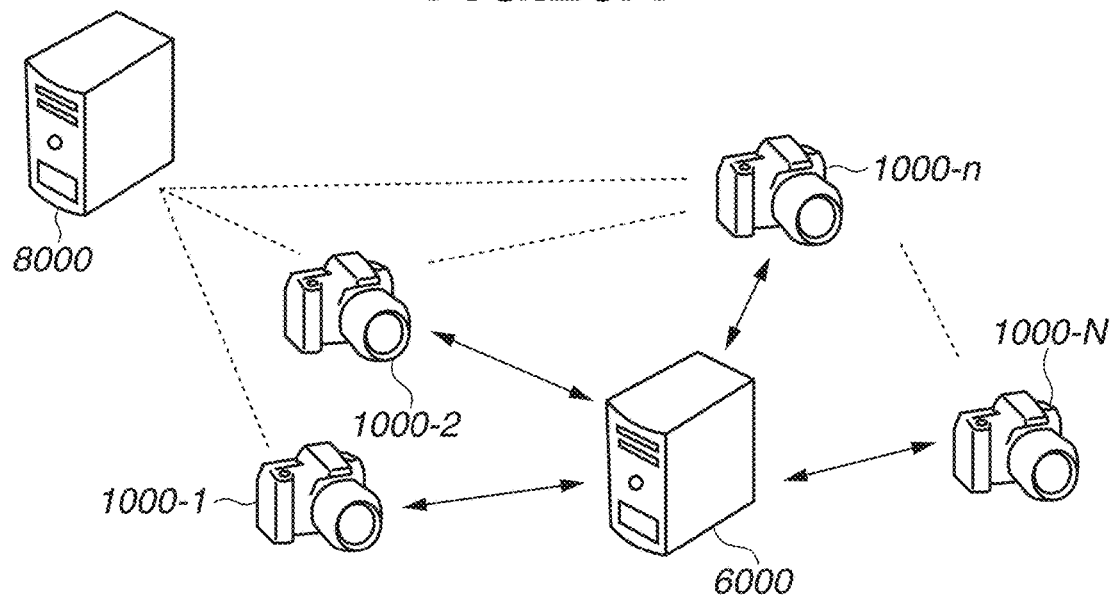
FIGS. 26A and 26B are diagrams illustrating configuration examples of an information processing system.
Figure 26B:
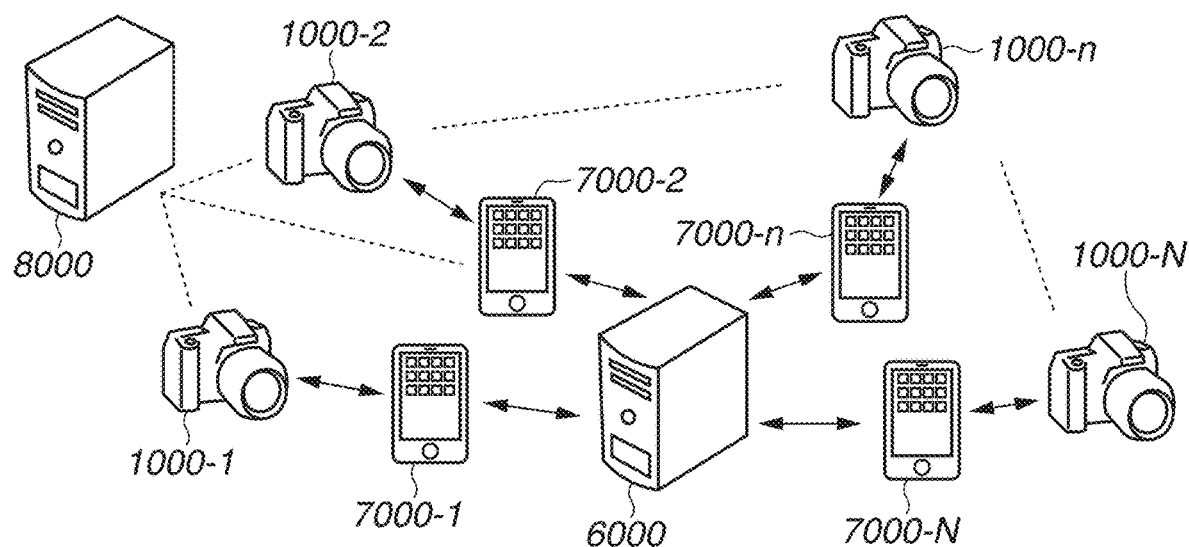
Figure 27:
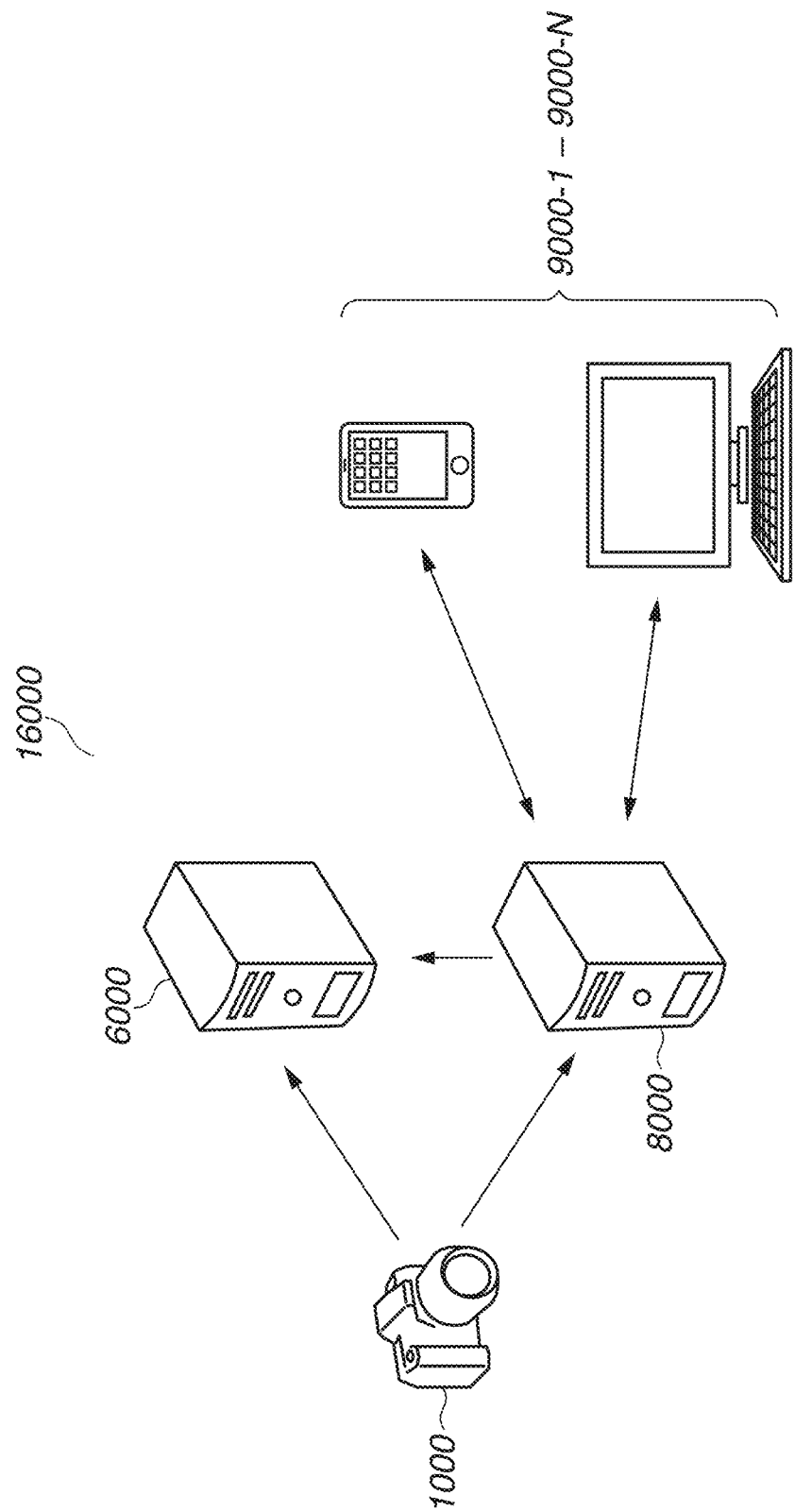
FIG. 27 is a diagram illustrating a configuration example of an information processing system.

FIGS. 26A and 26B illustrate system configurations for image sharing. A server apparatus 8000 may be a web server open to an unspecified large number of users, or a server open to only a specific plurality of users within a local area network (LAN). In FIG. 26A, images captured by imaging apparatuses 1000-1 to 1000-N are transmitted to the server apparatus 8000. At the same time, imaging time information about the images and user setting information are transmitted to an information processing apparatus 6000. Such information is associated with the images transmitted to the server apparatus 8000. The association can be established by filename or by date. The images transmitted to the server apparatus 8000 are viewed by a plurality of users via a website, such as a social networking service (SNS) website, and a contest website, an intranet, or a shared folder. In FIG. 26B, imaging apparatuses 1010-1 to 1010-N communicate images and information with the server apparatus 8000 via communication terminal apparatuses 7000-1 to 7000-N. FIG. 27 illustrates a system configuration example of an information processing system 16000. The information processing system 16000 includes an imaging apparatus 1000, an information processing apparatus 6000, a server apparatus 8000, and information terminals 9000-1 to 9000-N. The information terminals 9000-1 to 9000-N refer to PCs, tablets, mobile phones, and/or smartphones owned by a plurality of users. FIG. 28 illustrates a functional configuration example of the information processing system 16000. The information processing apparatus 6000 and the imaging apparatus 1000 have the same configuration as illustrated in FIG. 20A. The server apparatus 8000 includes a fourth transmission unit 8700, a fourth reception unit 8800, and a fourth storage unit 8500. The fourth transmission unit 8700 and the fourth reception unit 8800 communicate images and information with other apparatuses. The fourth storage unit 8500 stores information about webpages. The information terminal 9000-1 includes an evaluation acquisition unit 9100, a fifth transmission unit 9700, a fifth reception unit 9800, and a fifth storage unit 9500. The evaluation acquisition unit 9100 obtains evaluations of images from the user viewing the images on the website or via application software. The fifth storage unit 9500 stores evaluation information in which the images and the evaluations are linked with each other. The fifth transmission unit 9700 and the fifth reception unit 9800 communicate images and information with other apparatuses. The information terminal 9000-1 also includes a display unit 9010 for the user to view images. The information terminals 9000-2 to 9000-N have a similar configuration to that of the information terminal 9000-1.

Processing performed by the information processing system 16000 will be described with reference to FIG. 25B. In step S11101, the fifth reception unit 9800 of the information terminal 9000-1 obtains images and the parameters of the trained model corresponding to the images from the server apparatus 8000. In step S11102, the evaluation acquisition unit 9100 of the information terminal 9000-1 obtains a positive evaluation or negative evaluation of an image. Specifically, the evaluation acquisition unit 9100 obtains the evaluation of the image from the user viewing the image on the website or via application software. As in the evaluation performed by the image-capturing user in the fifth exemplary embodiment, the image is evaluated in terms of good or bad or by numerical grade evaluation. For example, the user selects a favorite image from among images displayed on the display unit 9010. An operation by which the user gives a positive evaluation to an image will be referred to as a fifth operation, and an operation by which the user gives a negative evaluation will be referred to as a sixth operation. In step S11103, the fifth transmission unit 9700 of the information terminal 9000-1 transmits the evaluation result obtained from the viewing user to the fourth reception unit 8800 of the server apparatus 8000. The fourth transmission unit 8700 of the server apparatus 8000 transmits the received evaluation result of the image to the information processing apparatus 6000. In step S11104, the second training unit 6100 of the information processing apparatus 6000 performs training based on the transmitted evaluation result, and updates the parameters of the trained model. The greater the number of information terminals 9000-1 to 9000-N, the more evaluation information is collected. In such a manner, by having a plurality of users share and evaluate captured images, the parameters of the trained model are trained so that controls useful to a large number of users are performed.

(Second Modification)

The parameters of the trained model suitable for a user can be determined based on the user's evaluations of images. Initially, suppose that images captured under various parameters are collected on a website, such as an SNS website or a contest website. For example, images captured in similar situations can be accompanied by settings such as enhancing flower color, focusing on a person making a specific motion or in a specific state, and darkening buildings. In other words, an image In (n=1, . . . , Nm) is linked with information that the image In is captured by using a parameter $\Theta_c$ (c=1, . . . , C) of the trained model. Suppose that a user gives an evaluation "Like" to a plurality of images Ik. Based on such evaluations, an error between a parameter $\Theta'$ of the trained model suitable for such images Ik and a parameter $\Theta$ used in actual imaging is determined as an update value. The smaller the update value, the closer imaging control to the user's need the trained model can provide. In contrast, the greater the update value, the less useful imaging operation to the user the imaging apparatus can make. The parameters of the trained model thus can be determined closer to user's own preferences by the update values of the parameters of the trained model being compared. In capturing an image by using the imaging apparatus, the user can obtain an image suited to the user by performing imaging using the determined parameters of the trained model. The description is provided on the assumption that the trained model is a CNN as in the first exemplary embodiment.

FIG. 27 illustrates the system configuration. As in the fourth exemplary embodiment, images captured by the imaging apparatus 1000 are transmitted to the server apparatus 8000. The images are viewed and evaluated by a plurality of users via the information terminals 9000-1 to 9000-N. The evaluation results are transmitted to the server 8000, and then from the server 8000 to the information processing apparatus 6000. Suppose that the second storage unit 6500 of the information processing apparatus 6000 stores C types of parameters $\Theta_c$ (c=1, . . . , C) about the training model in the imaging apparatus 1000. The images to be viewed are each captured by controlling the camera with any one of trained models using the C types of parameters $\Theta_c$. FIG. 26B illustrates a functional configuration example of the information processing system 16000.

Figure 25B:
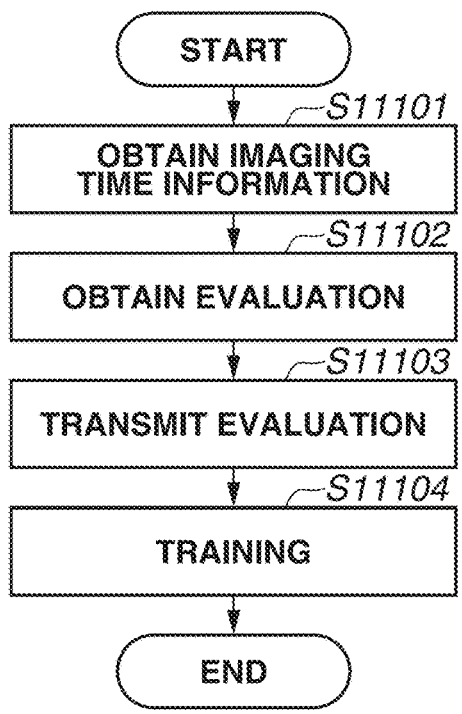

Referring now to FIG. 25B, a procedure for determining the parameters of the trained model suitable for a user based on the user's evaluation of an image will be described. In step S11101, the acquisition unit 1200 obtains images as imaging time information. In step S11102, the evaluation acquisition unit 1900 obtains an evaluation of an image, input by the user (fifth or sixth operation). In step S11103, the first transmission unit 1700 transmits the image and the evaluation to the information processing apparatus 6000. A specific processing method is similar to that of the foregoing exemplary embodiment. The training processing of step S11104, which is different from in the foregoing exemplary embodiment, will be described in detail. Initially, the evaluation acquisition unit 9100 obtains evaluations of Nm images In (n=1, . . . , Nm) made by a viewing user m. The second training unit 6100 of the information processing apparatus 6000 determines rewards given by the evaluations as r(m, n). The second training unit 6100 then calculates action values Q and a mean square error. A set of images captured by using the trained model corresponding to a parameter $\Theta_c$ among the Nm images will be denoted by $U_{m\Theta c}$. The number of images in the set of images, $U_{m\Theta c}$, will be denoted by $N_{m\Theta c}$. The time of the last frame at the end of imaging is $t_0$. For each output at imaging time $t=t_0$, $t_0-1, \ldots t \ldots, 1$, the map output section 2310 and the scalar/vector output section 2320 obtain respective action values Q' as follows:

$$Q'_{i,k}(s_t,(x,y)) = r(m,n)_{t+1} + \gamma Q_{i,k}(s_{t+1},(x,y)), \text{ and} \quad (23)$$

$$Q'_{j,h}(s_t) = r(m,n)_{t+1} + \gamma Q_{j,h}(s_{t+1}), \quad (24)$$

The definitions of the variables are similar to those in the fourth exemplary embodiment. A description thereof will thus be omitted. For the sake of simplicity, combinations of i, j, k, and h will be collectively expressed by l. An output result and a training value of the CNN set by the parameter $\Theta_c$ at time t will be denoted by $Q'(l, t|\Theta_c)$ and $Q(l, t|\Theta_c)$, as an output value, respectively. A mean square error MSE(m, n|$\Theta_c$) of the entire CNN set by the parameter $\Theta_c$ with respect to the training values is expressed by the following:

$$MSE(m, n | \Theta_c) = \frac{\sum_t \{Q'(l, t | \Theta_c) - Q(l, t | \Theta_c)\}^2}{T}. \quad (25)$$

An average value of the errors, MSE(m|$\Theta_c$), with respect to the set $U_{m\Theta c}$ of images that are captured under the parameter $\Theta_c$ and evaluated by the viewing user m is expressed by the following:

$$MSE(m, | \Theta_c) = \frac{\sum_{n \in U_{m\Theta_c}} MSE(m, n | \Theta_c)}{N_{m\Theta_c}}. \quad (26)$$

Errors are thus obtained parameter by parameter. The average error $MSE(m|\Theta_c)$ is an index indicating how far the parameter $\Theta_c$ is from the preferences of the viewing user m. On the basis of MSE, parameters $\Theta$ preferred by the user are determined. More specifically, the training with the parameter $\Theta_c$ is performed with a weight based on the average error $MSE(m|\Theta_c)$. For example, in performing training with the parameter $\Theta_c$, the learning coefficient of the CNN is multiplied by the following value $\eta_c$:

$$\eta_c = \exp(-\zeta MSE(m|\Theta_c)). \quad (27)$$

Here, $\zeta$ is a control parameter. For example, the control parameter $\zeta$ is set to $\zeta=1$.

If training is performed with only parameters closest to the preferences of the viewing user m, $\eta_c$ may be set as follows:

$$\eta_c = \begin{cases} 1 & \text{if } c = \operatorname*{argmin}_{\varepsilon} MSE(m|\Theta_\varepsilon) \\ 0 & \text{otherwise} \end{cases} \quad (28)$$

In such a manner, parameters close to the preferences of each viewing user can be trained. Each parameter is thereby trained to approach the preferences of specific users. In particular, if the total number of parameters, C, is smaller than the total number of viewing users, Nm, the parameters are trained by a plurality of users having similar preferences. If a predetermined range or condition (for example, the absolute value of the average error $MSE(m|\Theta_c)$ is 1 or less) is satisfied, the parameter $\Theta_c$ is likely to be close to the preferences of the viewing user. Such a parameter $\Theta_c$ is used for training.

The user who owns the imaging apparatus 1000 makes similar evaluations for the published images as one of the viewing users. Here, the value of Eq. (28) is calculated, and if a parameter $\Theta_c$ yields $\eta_c=1$, the parameter $\Theta_c$ is considered to match the user's preferences and the index c is registered in the imaging apparatus 1000. This enables the imaging apparatus 1000 to perform imaging control tailored the preferences of the user by reading the parameters of the trained model during imaging.

As described above, the user performing desired data operations on the captured images enables updating of the parameters of the trained model concerning the control operations for obtaining the images. The imaging apparatus 1000 according to the present exemplary embodiment can thus provide control operations suitable to obtain images closer to ones desired by the user.

While the network structure of the CNN is described to be common among imaging apparatuses, imaging apparatuses may use CNNs of respective different network structures. For example, the number of intermediate layers may be different.

An exemplary embodiment of the present disclosure can also be implemented by performing the following processing. The processing includes supplying software (program) for implementing the functions of the foregoing exemplary embodiments to a system or an apparatus via a data communication network or various storage media. The processing further includes reading and executing the program by a computer (or CPU or microprocessing unit (MPU)) of the system or apparatus. The program may be provided as recorded on a computer-readable recording medium.

According to an exemplary embodiment of the present disclosure, imaging control as intended by the user can be performed.

The present disclosure is not limited to the foregoing exemplary embodiments, and various changes and modifications may be made without departing from the spirit and scope of the present invention. To make public the scope of the present invention, the following claims are appended:

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-125009, filed Jun. 29, 2018, and No. 2018-125010, filed Jun. 29, 2018, which are hereby incorporated by reference herein in their entirety.

What is claimed is:

1. An imaging apparatus configured to estimate information about an imaging setting of the imaging apparatus by using a trained model, the imaging apparatus comprising:
   one or more processors, wherein the one or more processors function as:
   a detection unit configured to detect a first operation for imaging; and
   an update unit configured to update a connection weight of the trained model through reinforcement learning in which, in a state in which the information has been estimated using the trained model, (1) a positive reward is given in a case where imaging under the imaging setting based on the information is performed in response to detection of the first operation by the detection unit and (2) a negative reward is given in a case where the imaging is not performed.

2. The imaging apparatus according to claim 1, wherein the one or more processors further function as:

an estimation unit configured to estimate the information by inputting an image being captured into the trained model in which the connection weight updated by the update unit is set; and a control unit configured to change the imaging setting of the imaging apparatus based on the information estimated by the estimation unit.

3. The imaging apparatus according to claim 1, wherein the trained model is configured to further accept an imaging mode corresponding to an object as an input and estimate the information.

4. The imaging apparatus according to claim 1, wherein the one or more processors further function as:

a switching unit configured to switch to an imaging mode selected by a user among at least one or more imaging modes; and a storage unit configured to store the connection weight corresponding to each imaging mode, wherein the update unit is configured to update the connection weight of the trained model corresponding to the imaging mode to which the switching unit switches among the connection weight(s) of the trained model stored in the storage unit.

5. The imaging apparatus according to claim 1, wherein the one or more processors further function as:

an identification unit configured to identify an imaging mode from an image being captured among at least one or more imaging modes to be set based on an object; and a storage unit configured to store the connection weight corresponding to each imaging mode, wherein the update unit is configured to update the connection weight of the trained model corresponding to the imaging mode among the connection weight(s) of the trained model stored in the storage unit.

6. The imaging apparatus according to claim 5, wherein the identification unit is configured to identify the imaging mode by using a classifier configured to output the imaging mode with the image being captured as an input, and wherein the imaging apparatus further comprising a mode update unit configured to update a parameter of the classifier by determining, when the first operation is detected by the detection unit, a positive label, and when a second operation which is different from the first operation is detected, a negative label for the imaging mode identified by the identification unit.

7. The imaging apparatus according to claim 1, wherein the trained model is configured to input a plurality of time-series images obtained between when imaging is started and when the first operation detected by the detection unit or a second operation which is different from the first operation, and wherein the update unit is configured to update the connection weight of the trained model by determining, when the first operation is detected by the detection unit, a positive reward, and when the second operation is detected, a negative reward for the information having been estimated for the plurality of time-series information.

8. The imaging apparatus according to claim 1, wherein the update unit is configured to, when an instruction to suspend the reinforcement learning is provided by a user, suppress update of the connection weight.

9. The imaging apparatus according to claim 1, wherein the update unit is configured to, when the number of times a second operation which is different from the first operation is detected in a predetermined period is less than or equal to a predetermined number of times, suppress update of the connection weight.

10. The imaging apparatus according to claim 1, wherein the update unit is configured to, when the number of times the first operation is detected by the detection unit in a predetermined period is greater than or equal to a predetermined number of times, suppress update of the connection weight.

11. The imaging apparatus according to claim 1, wherein the update unit is configured to, when there is a setting to suspend the reinforcement learning and the number of times the first operation is detected by the detection unit in a predetermined period is less than or equal to a predetermined number of times, resume updating the connection weight.

12. The imaging apparatus according to claim 1, wherein the update unit is configured to, when there is a setting to suspend the reinforcement learning and the number of times a second operation which is different from the first operation is detected in a predetermined period is greater than or equal to a predetermined number of times, resume updating the connection weight.

13. The imaging apparatus according to claim 1, wherein the update unit is configured to, when a probability that the imaging apparatus selects a control action to make the imaging setting such that the first operation is likely to be detected is higher than a predetermined value in a predetermined period, suppress update of the connection weight.

14. The imaging apparatus according to claim 1, further comprising:

a shutter button configured to be able to be half pressed and fully pressed, half pressing being an operation for giving an instruction for estimating the information by using the trained model, full pressing being an operation for giving an instruction for performing imaging;

wherein the detection unit detects the full pressing of the shutter button as the first operation, and wherein the update unit updates the connection weight of the trained model through reinforcement learning in which a positive reward is given to the information in a case where imaging under the imaging setting that is in accordance with the information estimated using the trained model when the shutter button is half pressed is performed in response to detection of the first operation by the detection unit and a negative reward is given to the information in a case where imaging under the imaging setting that is in accordance with the information is not performed due to cancellation of the operation of the shutter button, canceled by not performing the full pressing of the shutter button after the half pressing of the shutter button.

15. An imaging apparatus configured to estimate information about an imaging setting of the imaging apparatus by using a trained model, the imaging apparatus comprising:

one or more processors, wherein the one or more processors function as:

a detection unit configured to detect a third operation for storing a captured image or a fourth operation for deleting or modifying the image; and a update unit configured to update a connection weight of the trained model through reinforcement learning by determining, when the third operation is detected by the detection unit, a positive reward, and when the fourth operation is detected by the detection unit, a negative reward for the information when the image is captured.

16. A method for controlling an imaging apparatus configured to estimate information about an imaging setting of the imaging apparatus by using a trained model, the method comprising:
   detecting a first operation for imaging; and
   updating a connection weight of the trained model through reinforcement learning in which, in a state in which the information has been estimated using the trained model, (1) a positive reward is given in a case where imaging under the imaging setting based on the information is performed in response to detection of the first operation and (2) a negative reward is given in a case where the imaging is not performed.

17. A non-transitory storage medium storing a program for causing a computer to perform a method for controlling an imaging apparatus configured to estimate information about an imaging setting of the imaging apparatus by using a trained model, the method comprising:
   detecting a first operation for imaging; and
   updating a connection weight of the trained model through reinforcement learning in which, in a state in which the information has been estimated using the trained model, (1) a positive reward is given in a case where imaging under the imaging setting based on the information is performed in response to detection of the first operation and (2) a negative reward is given in a case where the imaging is not performed.

18. An imaging system configured to estimate information about an imaging setting of an imaging apparatus by using a trained model, the imaging system comprising:
   a detection unit configured to detect a first operation for finalizing imaging or a second operation for interrupting imaging of the imaging apparatus in which the imaging setting has been made based on the information estimated by the trained model;
   an acquisition unit configured to determine, when the first operation is detected by the detection unit, a positive reward, and when the second operation is detected by the detection unit, a negative reward for the information having been estimated when the first operation or the second operation is detected by the detection unit, and obtain update information about update of a connection weight of the trained model through reinforcement learning; and
   a update unit configured to update the connection weight of the trained model based on the update information about the update.

19. An imaging system configured to estimate information about an imaging setting of an imaging apparatus by using a trained model, the information processing system comprising:
   one or more processors, wherein the one or more processors function as:
   a detection unit configured to detect a third operation for storing an image or a fourth operation for deleting the image; and
   an acquisition unit configured to determine, when the third operation is detected by the detection unit, a positive reward, and when the fourth operation is detected by the detection unit, a negative reward for the information when the image is captured, and obtain information about update of a connection weight of the trained model through reinforcement learning.

20. An imaging system configured to estimate information about an imaging setting of an imaging apparatus by using a trained model, the information processing system comprising:
   one or more processors, wherein the one or more processors function as:
   a detection unit configured to detect a fifth operation for giving a good evaluation to an image or a sixth operation for giving a bad evaluation to the image; and
   an acquisition unit configured to determine, when the fifth operation is detected by the detection unit, a positive reward, and when the sixth operation is detected by the detection unit, a negative reward for the information when the image is captured, and obtain information about update of a connection weight of the trained model through reinforcement learning.

21. An apparatus comprising:
   one or more processors, wherein the one or more processors function as:
   an acquisition unit configured to acquire first information indicating an imaging setting under which an image was captured;
   another acquisition unit configured to acquire second information indicating an imaging setting that was determined by an imaging apparatus and was not used for imaging; and
   a learning unit configured to learn a model for inferring an imaging setting through reinforcement learning in which a positive reward is given to an imaging setting indicated by the first information and a negative reward is given to an imaging setting indicated by the second information.

* * * * *